United States Patent
Wolfinger et al.

(10) Patent No.: US 11,059,739 B2
(45) Date of Patent: *Jul. 13, 2021

(54) COLOURED STOVE SIGHTGLASS WITH COLOUR-NEUTRAL TRANSMISSION CHARACTERISTICS

(71) Applicant: SCHOTT AG, Mainz (DE)

(72) Inventors: Matthias Wolfinger, Kriftel (DE); Falk Gabel, Schlangenbad (DE); Friedrich Siebers, Nierstein (DE); Evelin Weiss, Mainz (DE); Matthias Bockmeyer, Mainz (DE); Oliver Hochrein, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,906

(22) Filed: Dec. 21, 2018

(65) Prior Publication Data
US 2019/0194062 A1 Jun. 27, 2019

(30) Foreign Application Priority Data

Dec. 22, 2017 (DE) .......................... 102017131051.7
May 7, 2018 (DE) .......................... 202018102534.1
May 11, 2018 (DE) .......................... 102018111330.7

(51) Int. Cl.
C03C 10/00 (2006.01)
C03C 10/12 (2006.01)
(Continued)

(52) U.S. Cl.
CPC ...... *C03C 10/0027* (2013.01); *C03B 23/0305* (2013.01); *C03B 27/012* (2013.01);
(Continued)

(58) Field of Classification Search
CPC .................................................. C03C 10/0027
See application file for complete search history.

(56) References Cited

U.S. PATENT DOCUMENTS

| 3,756,798 A | 9/1973 | Ernsberger |
| 3,788,865 A | 1/1974 | Babcock |
(Continued)

FOREIGN PATENT DOCUMENTS

| CN | 1326903 | 12/2001 |
| CN | 1332127 | 1/2002 |
(Continued)

OTHER PUBLICATIONS

D65 standard illuminant light, Wikipedia, 4 pages.
(Continued)

*Primary Examiner* — Karl E Group
(74) *Attorney, Agent, or Firm* — Ohlandt, Greeley, Ruggiero & Perle, L.L.P.

(57) ABSTRACT

A sightglass for a stove is provided that has a substrate made of transparent coloured lithium aluminium silicate glass ceramic. The sightglass has a light transmittance of 0.1% to 50%. Standard illuminant D65 light, after passing through the glass ceramic, at a thickness of 4 mm, has a colour locus in the white region W1 determined by the following coordinates in the chromaticity diagram CIExyY-2°:

| White region W1 ||
| x | y |
| --- | --- |
| 0.27 | 0.21 |
| 0.22 | 0.25 |
| 0.32 | 0.37 |
| 0.45 | 0.45 |
| 0.47 | 0.34 |
| 0.36 | 0.29. |

18 Claims, 5 Drawing Sheets

(51) Int. Cl.

| | | |
|---|---|---|
| *F24C 15/10* | (2006.01) | |
| *C03C 3/087* | (2006.01) | |
| *C03C 3/097* | (2006.01) | |
| *C03C 1/00* | (2006.01) | |
| *C03B 23/03* | (2006.01) | |
| *C03B 27/012* | (2006.01) | |
| *C03B 32/02* | (2006.01) | |
| *C03C 3/083* | (2006.01) | |
| *C03C 4/10* | (2006.01) | |
| *H05B 3/74* | (2006.01) | |

(52) U.S. Cl.
CPC .............. *C03B 32/02* (2013.01); *C03C 1/002* (2013.01); *C03C 3/083* (2013.01); *C03C 3/087* (2013.01); *C03C 3/097* (2013.01); *C03C 4/10* (2013.01); *C03C 10/00* (2013.01); *F24C 15/10* (2013.01); *H05B 3/74* (2013.01)

(56) References Cited

U.S. PATENT DOCUMENTS

| | | | | |
|---|---|---|---|---|
| 4,273,586 | A * | 6/1981 | Flannery | C03C 3/087 501/153 |
| 4,285,728 | A | 8/1981 | Babcock | |
| 4,455,160 | A | 6/1984 | Rittler | |
| 4,461,839 | A | 7/1984 | Rittler | |
| 4,526,872 | A * | 7/1985 | Andrieu | C03C 1/10 501/4 |
| 4,835,121 | A | 5/1989 | Shibuya | |
| 5,010,041 | A * | 4/1991 | Koyama | C03C 10/0027 501/4 |
| 5,179,045 | A * | 1/1993 | Aitken | C03C 4/02 501/4 |
| 5,204,293 | A | 4/1993 | Amundson, Jr. | |
| 5,212,122 | A | 5/1993 | Pannhorst | |
| 5,256,600 | A | 10/1993 | Pfitzenmaier | |
| 5,446,008 | A | 8/1995 | Krolla | |
| 5,491,115 | A * | 2/1996 | Pfitzenmaier | C03C 4/02 501/4 |
| 6,413,906 | B1 | 7/2002 | Shimatani | |
| 8,198,201 | B2 * | 6/2012 | Comte | C03C 3/085 501/4 |
| 8,722,554 | B2 | 5/2014 | Comte | |
| 8,765,619 | B2 | 7/2014 | Brunet | |
| 9,018,113 | B2 * | 4/2015 | Siebers | C03B 32/02 501/4 |
| 9,156,727 | B2 | 10/2015 | Siebers | |
| 2002/0011481 | A1 | 1/2002 | Melson | |
| 2002/0023463 | A1 | 2/2002 | Siebers | |
| 2003/0054935 | A1 | 3/2003 | Kitamura | |
| 2003/0218001 | A1 | 11/2003 | Siebers | |
| 2004/0198579 | A1 | 10/2004 | Horsfall | |
| 2005/0252503 | A1 | 11/2005 | Siebers | |
| 2007/0004578 | A1 | 1/2007 | Comte | |
| 2007/0056961 | A1 | 3/2007 | Shimatani | |
| 2007/0108184 | A1 | 5/2007 | Imamoto | |
| 2007/0129231 | A1 | 6/2007 | Comte | |
| 2007/0232476 | A1 | 10/2007 | Siebers | |
| 2007/0293386 | A1 | 12/2007 | Goto | |
| 2008/0026927 | A1 | 1/2008 | Comte | |
| 2008/0090034 | A1 | 4/2008 | Harrison | |
| 2008/0139375 | A1 | 6/2008 | Wennemann | |
| 2008/0184740 | A1 | 8/2008 | Waldschmidt | |
| 2008/0207424 | A1 | 8/2008 | Aitken | |
| 2009/0018007 | A1 | 1/2009 | Siebers | |
| 2010/0047556 | A1 | 2/2010 | Bockmeyer | |
| 2010/0130341 | A1 * | 5/2010 | Wondraczek | C03C 1/10 501/4 |
| 2010/0304944 | A1 | 12/2010 | Comte | |
| 2011/0140843 | A1 | 6/2011 | Nireki | |
| 2011/0226231 | A1 | 9/2011 | Siebers | |
| 2012/0067865 | A1 | 3/2012 | Siebers | |
| 2012/0085336 | A1 | 4/2012 | Brunet | |
| 2013/0070451 | A1 | 3/2013 | Mulet | |
| 2013/0098903 | A1 * | 4/2013 | Di Giovanni | H05B 6/1218 219/622 |
| 2013/0164509 | A1 * | 6/2013 | Siebers | C03C 10/0027 428/210 |
| 2013/0178353 | A1 | 7/2013 | Comte | |
| 2013/0201678 | A1 | 8/2013 | Siebers | |
| 2013/0328946 | A1 | 12/2013 | Zenker | |
| 2014/0009370 | A1 | 1/2014 | Weiss | |
| 2014/0146530 | A1 | 5/2014 | Guiset | |
| 2014/0146538 | A1 | 5/2014 | Zenker | |
| 2014/0194270 | A1 * | 7/2014 | Shiratori | C03C 10/0027 501/32 |
| 2014/0238971 | A1 | 8/2014 | Comte | |
| 2014/0356608 | A1 | 12/2014 | Lentes | |
| 2015/0266770 | A1 | 9/2015 | Miyasaka | |
| 2015/0266771 | A1 | 9/2015 | Miyasaka | |
| 2015/0274579 | A1 | 10/2015 | Plevacova | |
| 2016/0031755 | A1 | 2/2016 | Hoppe | |
| 2016/0168018 | A1 | 6/2016 | Gabel | |
| 2016/0176752 | A1 | 6/2016 | Gabel | |
| 2016/0281961 | A1 | 9/2016 | Laluet | |
| 2017/0215236 | A1 | 7/2017 | Doerk | |
| 2019/0062201 | A1 | 2/2019 | Weiss | |
| 2019/0194054 | A1 * | 6/2019 | Siebers | C03C 3/087 |
| 2019/0194060 | A1 * | 6/2019 | Weiss | C03C 3/097 |
| 2019/0194061 | A1 * | 6/2019 | Weiss | C03C 4/02 |

FOREIGN PATENT DOCUMENTS

| | | |
|---|---|---|
| CN | 1696072 | 11/2005 |
| CN | 1784363 | 6/2006 |
| CN | 1871179 | 11/2006 |
| CN | 101085699 | 12/2007 |
| DE | 1796298 | 5/1972 |
| DE | 2705948 | 9/1977 |
| DE | 2844030 | 4/1979 |
| DE | 3345316 | 6/1984 |
| DE | 3927174 | 2/1990 |
| DE | 19939787 | 1/2001 |
| DE | 10338165 | 3/2005 |
| DE | 102007036407 | 9/2008 |
| DE | 102008031428 | 1/2010 |
| DE | 102008040097 | 1/2010 |
| DE | 102008050263 | 4/2010 |
| DE | 202011110029 | 10/2012 |
| DE | 102014226986 | 6/2016 |
| DE | 102015103461 | 9/2016 |
| DE | 102016101036 | 7/2017 |
| DE | 102017101114 | 7/2017 |
| DE | 102016103524 | 8/2017 |
| DE | 202018100558 | 2/2018 |
| EP | 0220333 | 5/1987 |
| EP | 1074520 | 2/2001 |
| EP | 1465460 | 10/2004 |
| EP | 1398303 | 11/2005 |
| EP | 1837312 | 9/2007 |
| EP | 2435378 | 7/2014 |
| EP | 2817265 | 12/2014 |
| EP | 3208545 | 8/2017 |
| EP | 3049374 | 11/2017 |
| FR | 3002532 | 8/2014 |
| GB | 1562332 | 3/1980 |
| GB | 2430249 | 2/2009 |
| JP | H0551235 | 3/1993 |
| JP | H11100229 | 4/1999 |
| JP | H11100230 | 4/1999 |
| JP | H11100231 | 4/1999 |
| JP | 2004251615 | 9/2004 |
| JP | 2006252808 | 9/2006 |
| JP | 6086311 | 3/2017 |
| WO | 0216279 | 2/2002 |
| WO | 2010013700 | 2/2010 |
| WO | 2010102859 | 9/2010 |
| WO | 2010137000 | 12/2010 |
| WO | 2011089220 | 7/2011 |
| WO | 2012010278 | 1/2012 |
| WO | 2012076412 | 6/2012 |
| WO | 2012076414 | 6/2012 |

(56) References Cited

FOREIGN PATENT DOCUMENTS

| WO | 2012168011 | 12/2012 |
| WO | 2013124240 | 8/2013 |
| WO | 2014170275 | 10/2014 |
| WO | 2018224556 | 12/2018 |

OTHER PUBLICATIONS

DIN EN 410, "Glass in building—Determination of luminous and solar characteristics of glazing", Apr. 2011, 66 pages.
DIN EN ISO 11664-4 "Colorimetry—Part 4: CIE 1976 L*a*b* colour space", Jun. 2012, 12 pages.
ASTM D1003-13, "Standard Test Method for Haze and Luminous Transmittance of Transparent Plastics", Nov. 15, 2013, 7 pages.
DIN ISO 7884-8, "Glass—Viscosity and viscometric fixed points—Part 8: Determination of (dilatometric) transformation temperature", Feb. 1998, 7 pages. (formerly DIN 52324).
ISO 7991, "Glass—Determination of coefficient of mean linear thermal expansion", Dec. 15, 1987, 12 pages.
DIN 52324 (replaced by DIN ISO 7884-8), "Glass—Viscosity and viscometric fixed points—Part 8: Determination of (dilatometric) transformation temperature", Feb. 1998, 7 pages.
Glass Ceramic transmission: Schott Nextrema optical properties, Schott North America, Oct. 2017.
Le Bourhis, "Glass Mechanics and Technology", Wiley-VCH GmbH & Co. KGaA, 3 pages.
"Schott Technical Glasses", Schott AG, Mainz, Germany, Oct. 2007, 40 Pages.

\* cited by examiner

COLOURED STOVE SIGHTGLASS WITH COLOUR-NEUTRAL TRANSMISSION CHARACTERISTICS

CROSS REFERENCE TO RELATED APPLICATIONS

This application claims priority under 35 USC § 119 of German Application DE 10 2017 131 051.7 filed Dec. 22, 2017, German Application DE 20 2018 102 534.1 filed May 7, 2018, and German Application DE 10 2018 111 330.7 filed May 11, 2018, the entire disclosure of each of which is incorporated herein by reference.

BACKGROUND

1. Field of the Disclosure

The disclosure relates to a sightglass made of transparent coloured glass ceramic for a stove with colour-neutral transmission characteristics.

2. Description of Related Art

It is known that glasses composed of the $Li_2O$—$Al_2O_3$—$SiO_2$ lithium aluminium silicate (LAS) system can be converted to glass ceramics having high quartz mixed crystals and/or keatite mixed crystals as main crystal phases. For the first type of glass ceramics the synonyms "β-quartz" or "β-eucryptite" can also be found in the literature as a description of the crystal phases, and for the second type "β-spodumene". A preferred field of use for LAS glass ceramics is their use in stove sightglasses.

A key property of these glass ceramics is that, within a temperature range from room temperature to about 700° C., they have extremely low coefficient of thermal expansion $\alpha_{20/700}$ of typically below $1.5 \cdot 10^{-6}$/K. Glass ceramics with high quartz mixed crystals as main crystal phase have lower coefficients of thermal expansion in the region of their use temperatures, for example as cooking surface, that are usually around $0 \pm 0.3 \cdot 10^{-6}$/K, while the glass ceramics with keatite mixed crystals as main crystal phase are at values around $0.8 \cdot 10^{-6}$/K to $1.5 \cdot 10^{-6}$/K. The two glass ceramic types also differ in their average crystallite sizes. Glass ceramics with high quartz mixed crystals are producible in transparent or transparent coloured form owing to their relatively small crystallite size of typically below 50 nm. If keatite forms the main phase, the average crystallite sizes are typically above 100 nm and are translucent to opaque owing to the resulting light scatter. However, there are also transparent keatite phases described, for example, in DE 10 2014 226 986 A1 or FR 3 002 532 A1.

Owing to the low thermal expansion at their use temperatures, LAS glass ceramics have excellent temperature difference stability and thermal cycling stability, and constancy of dimensions. Consequently, such glass ceramics are generally of particularly good suitability for use as sightglasses for stoves.

The industrial scale production of LAS glass ceramics is known to those skilled in the art. This involves first melting and refining the crystallizable starting glass from a mixture of shards and pulverulent batch raw materials at temperatures typically between 1550° C. and 1700° C. Refining agents used are usually arsenic oxide and/or antimony oxide or, especially for eco-friendly refining, tin oxide. For improvement of bubble quality, it is also possible to use high-temperature refining above 1700° C. After melting and refining, the glass typically undergoes hot forming by casting, pressing or by rolling or floating in order to produce plates.

In a subsequent thermal process, the starting glass is converted to the glass ceramic article by controlled crystallization. This ceramization is effected in a two-stage temperature process in which seeds, typically composed of $ZrO_2$/$TiO_2$ mixed crystals, are first produced by nucleation at a temperature between 680° C. and 800° C. When the temperature is subsequently increased, the high quartz mixed crystals grow onto these seeds at the crystallization temperature of 800° C. to 950° C.

At the maximum production temperature, the microstructure of the glass ceramic is homogenized; at the same time, the optical, physical and chemical properties are established.

If desired, the high quartz mixed crystals can subsequently be transformed to keatite mixed crystals. The transformation to keatite mixed crystals is effected with increasing temperature within a temperature range of about 950° C. to 1250° C. Transformation increases the coefficient of thermal expansion of the glass ceramic, and further crystal growth is generally associated with light scatter with a translucent to opaque appearance. The transformation increases the crystallinity and the glass ceramics become harder.

However, DE 102017101114 A1 also discloses a process for producing glass ceramic with keatite mixed crystals as main phase in the core of the glass ceramic and simultaneously low scatter of light in the visible spectral region. The glass ceramic produced by means of this process simultaneously has high mechanical strength.

By addition of colour oxides such as $V_2O_5$, CoO, NiO, $Fe_2O_3$, $Cr_2O_3$, $CeO_2$ individually or in combination, it is possible to colour the glass ceramics, in order, for example, to produce dark plates or sheets with a particular transmission profile. This is described, for example, in DE 202018100558 U1.

Lithium aluminium silicate glass ceramics can thus be divided into three categories on the basis of the different optical properties. A distinction is made between (1) transparent uncoloured, (2) transparent coloured and (3) translucent glass ceramics.

In this connection, "transparent" means that the glass ceramics have only low scatter for visible light. More particularly, they have a haze of less than 20%. One reason for the low light scatter is the high seed density, the effect of which is that the high quartz mixed crystals that grow on, in terms of their size, are below the wavelength range of visible light. Typically, the average crystallite size of the high quartz mixed crystals is in the range from 20 nm to 50 nm. A high seed density assumes adequate contents of nucleating agents and adequate nucleation times during the ceramization.

In this connection, "translucent" means that the glass ceramics have high scatter for visible light. More particularly, they have a haze of 20% or more. According to this definition, the opaque glass ceramics are likewise part of the class of the translucent glass ceramics.

In this connection, "uncoloured" means that the glass ceramics have a light transmittance of more than 80%.

In this connection, "coloured" means that the glass ceramics have a light transmittance of 80% or less.

In the case of the transparent uncoloured glass ceramics, high light transmittance, low scatter and very low intrinsic colour are desired. Owing to these properties, as stove sightglasses, they assure particularly good visibility of the burning fire.

The establishment of low intrinsic colour is very complex in the case of glass ceramics with high transmission. In any case, very pure raw materials have to be used for the purpose. More particularly, it is necessary here to avoid iron-containing impurities. Furthermore, it can be necessary to specifically add particular colouring components in order to compensate for the colour resulting from impurities. This technique is also referred to as overcolouring. The overcolouring does slightly reduce the overall transmission in favour of colour neutrality, but it is nevertheless above 80%. The use of particularly pure raw materials and additional colouring components is disadvantageous for economic reasons.

For example, DE 2705948 A1 discloses a method of overcolouring by means of $Nd_2O_3$. In the specific compositions described therein, the $Nd_2O_3$ compensates for the absorption of an Fe/Ti colour complex. $Nd_2O_3$ is a particularly costly and hence economically particularly disadvantageous colouring component. Therefore, it is suitable for use in small amounts for overcolouring, but not for use in greater volumes as main colorant.

The transparent coloured glass ceramics differ from the transparent non-coloured glass ceramics in that transmission is lowered via the controlled addition of one or more colouring compounds. The resulting spectral progression of the transmission curve for a defined thickness gives rise to the colour of the glass ceramic and the brightness thereof.

In the case of the translucent glass ceramics, according to the conditions in the production, the scatter of visible light can be adjusted to different intensities. The translucent glass ceramics can likewise be coloured by addition of colouring compounds. Since light scatter has an adverse effect on the outline sharpness of the flames, translucent glass ceramics are not used for stove sightglasses.

DE 202018100558 U1 discloses transparent coloured glass ceramics having a light transmittance of 2.5% to 10% for use as stove sightglasses. Such a light transmittance achieves the effect that, although the flame can be seen in operation of the stove, the space behind the glass with the fire extinguished remains in the dark and hence, for example, the inner structure of the oven or stove, which is not very attractive, is invisible. This effect is described as the "dead front effect". The glass ceramics described therein have been coloured by means of $V_2O_5$ and $Fe_2O_3$. A typical property of $V_2O_5$ as colorant is that it has a much higher transmission in the red spectral region than in the green or blue spectral region. A disadvantage in the case of use of such a glass ceramic as stove sightglass is that the colour of the flame is altered. If a flame is viewed through such a glass ceramic, it has an unnatural red appearance.

DE 102007036407 A1 discloses stove sightglasses having a partly transparent, reflective coating. In this case, given suitable choice of the transparency of the coating, a dead front effect can likewise be achieved. What is advantageous about this solution is that a reflective coating generally does not alter the colour locus of the flame in transmission. However, a disadvantage is that a coating operation constitutes at least one additional process step in the production. Thus, a coated stove sightglass is economically disadvantageous compared to an uncoated glass.

A further disadvantage of reflective coatings is that the visibility of the flame, for a given reflectivity of the coating, depends on the lighting situation in the exterior of the stove. The light intensity that is produced by the flame and passes through the partly transparent coating is fixed depending on the design. If such a stove is being operated in a bright environment, the ambient light reflected in the stove sightglass can be brighter than the transmitted light from the flame. In that case, the flame can be perceived only poorly, and under some circumstances even not at all.

Furthermore, the prior art discloses double-glazed stove sightglasses. In this case, the inner pane facing the fire consists of a transparent uncoloured glass ceramic, and the outer glass is a coloured tempered glass pane. Since the colouring of glasses is much simpler than the colouring of glass ceramics, there is a multitude of possible configurations available for the outer pane. More particularly, it is also possible to use grey glass for the outer pane. It is thus possible to achieve a good dead front effect without altering the colour of the flame. However, a disadvantage of such a solution is that the outer glass pane also becomes hot in operation. This can degrade the tempering. The effect of this is that the pane can be destroyed by the long-term thermal cycling stress. Furthermore, such a double glazing constitutes a considerable degree of extra construction complexity in the construction of a stove. Thus, double glazing is economical compared to single glass ceramic glazing, and disadvantageous for reasons of operational safety.

By contrast with glass ceramics, it is possible in the case of glasses, owing to the different, broader absorption bands, to create the flat transmission profile and the grey hue. For instance, US 20150274579 A1 describes plates made of tempered glass for induction cooking surfaces. With the content of colouring compounds of 0.8-1.8% by weight of $Fe_2O_3$, 0.02-0.06% by weight of CoO, 0-0.005% by weight of Se and 0-0.1% by weight of $Cr_2O_3$, it is possible to produce the desired flat transmission profile between 430 and 630 nm and to produce a grey glass with light transmission of at most 10% at thickness 4 mm. However, these colour oxides are unsuitable for the production of a colour-neutral glass ceramic since their colour effects in glass ceramics are different and they cannot generate a flat transmission profile.

SUMMARY

Colour-neutral transparent coloured glass ceramics are not known from the prior art. The reason for this is that the absorption bands on crystallization become narrower and move unfavourably. For example, the CoO looks blue in the glass, and purple in the glass ceramic. Moreover, new absorption bands in the short-wave region of the spectrum arise in the glass ceramic as a result of intensely colouring Fe/Ti and Sn/Ti colour complexes.

It is an object of the present disclosure to provide an inexpensive stove sightglass made of glass ceramic that prevents viewing into the stove when the stove is not in operation. At the same time, the stove sightglass is to allow the flame to shine through without colour change on operation of the stove.

Such a sightglass for a stove comprises a substrate made of transparent coloured lithium aluminium silicate glass ceramic, wherein the glass ceramic has a light transmittance of 0.1% to 50%. This glass ceramic has transmission characteristics such that D65 standard illuminant light, after passing through the glass ceramic, has a colour locus in the white region W1 determined by the following coordinates in the chromaticity diagram CIExyY-2°:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

A sightglass for a stove and the substrate that it comprises typically have an inner face and an outer face. The inner face is the side of the pane or substrate facing the interior, i.e. the combustion space of the stove. The outer face is the side facing the exterior.

The light transmittance of the glass ceramic of the sightglass of the disclosure is at least 0.1%, preferably at least 1%, 2%, 5%, >10%, >12%, >15% or even at least 20%. A particularly preferred range of transmittance is from 0.1% to 10%, and preferably from 2% to 6%. Such a transmittance ensures that the flame has good visibility in operation of the stove. The higher the transmittance, the better the visibility of the flame. The light transmittance of the glass ceramic is understood here to mean the light transmittance that results from the material properties of the glass ceramic at the particular thickness of the substrate.

The light transmittance of the glass ceramic of the sightglass of the disclosure is at most 50%, preferably at most 40%, 35%, 30%, more preferably at most 28%. Such a transmittance ensures that viewing into the interior of the stove is prevented when the stove is not in operation. The lower the transmittance, the better the prevention of viewing into the interior.

The light transmittance can thus, for example, be within one of the ranges of 0.1% to 50%, 1% to 50%, 2% to 40%, 5% to 40%, >10% to 35%, >12% to 35%, >15% to 30%, 20% to 30%, 20 to 28%, 20% to 35% or 20% to 40%. Other combinations of the upper and lower transmittance limits are likewise possible. Preferably, the light transmittance of the glass ceramic at a thickness of 4 mm or a thickness of 5 mm is within one of these ranges.

The person skilled in the art will select the suitable light transmittance according to the stove design and according to the desired pane geometry. The design and pane geometry also affect the total amount of incident light and hence the demand on transmittance.

For example, for a stove with a dark interior lining, the person skilled in the art will choose a higher transmittance than for an otherwise identical oven with light-coloured interior lining. In the case of larger sightglasses, more light enters the interior of a stove. Therefore, the larger the sightglass, the smaller the light transmittance that the person skilled in the art will choose. In the case of ovens with multiple sightglasses, the person skilled in the art will likewise choose lower light transmittances. According to the mode of firing or establishment of the conditions for the combustion, flames can be lighter or darker. The person skilled in the art will choose a lower light transmittance for lighter flames than for darker flames. The customary modes of firing include, for example, pellet, wood or gas ovens. The conditions for the combustion include, for example, the amount of fuel and the amount of oxygen available.

Particularly in the range of 20% to 40%, for most installation situations, there is a particularly balanced ratio of visibility of the flame and prevention of viewing into the interior. In addition, this range of transmission values is of particularly good suitability for use of the sightglass to cover a light-emitting display.

Light transmittance is determined in the wavelength range of 380 nm to 780 nm using D65 standard illuminant light to DIN EN 410. The light transmittance also corresponds to the brightness Y in the CIExyY-2° colour space. The German implementation of the international CIE standard is stipulated in DIN 5033. Other terms used for this in the literature are also light transmission and integral transmission.

It is a further feature of a sightglass of the disclosure that it comprises a glass ceramic such that D65 standard illuminant light, after passing through the glass ceramic at a thickness of 4 mm, has a colour locus in the white region W1.

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

The white region W1 is determined here as a region along the black-body curve in the CIExyY colour space that ranges from colour temperature about 2750 K to about 1 000 000 K and is shifted upward at the upper limit by a value of about $y=0.04$ relative to the black-body curve and downward at the lower limit by about $y=0.07$. This results in the following effect: by definition, light from the D65 standard illuminant has a colour temperature of about 6500 K and, when observed directly by a 2° observer, a colour locus of $x=0.31$ and $y=0.33$. By the present disclosure, it is thus possible, on passage of light through the substrate, to shift the colour locus of the light essentially along the black-body curves, either to higher or to lower colour temperatures, i.e. without producing an unwanted tint. It is likewise possible to not alter the colour locus at all, or at least not perceptibly. The light from a flame that passes through the substrate is thus either not changed in colour or moved to warmer or colder hues along the black-body curve.

Particularly gas flames with ideal combustion conditions emit cold white light. In the case of such flames, it can be desirable to shift the colour temperature of the flame to warmer colour temperatures. At the same time, however, the colour of the flame must not be altered such that it seems unnaturally colourful. This is possible with a sightglass of the disclosure since the colour temperature is moved solely along the black-body curve.

These properties result directly from the transmission characteristics of the glass ceramic and not from coatings on the substrate. Preferably, the stove sightglass has no partly transparent coatings. A partly transparent coating is understood here to mean a coating having a light transmittance between 1% and 80%. This term thus encompasses both reflective and absorbing coatings.

The colour locus of light after passage through the substrate can be measured, for example, with the Konica Minolta CS-150 colorimeter. It is likewise possible to measure the transmission spectrum of the substrate and to use this, with the aid of the known spectrum of D65 standard light and the eye sensitivity of a 2° normal observer in accordance with specifications of the CIE, to calculate the colour locus.

In a preferred embodiment, the sightglass is characterized in that the colour locus of D65 standard illuminant light, after passing through the glass ceramic at a thickness of 4 mm, is within a white region W2 determined in the chromaticity diagram CIExyY-2° by the following coordinates:

| White region W2 | |
|---|---|
| x | Y |
| 0.25 | 0.27 |
| 0.32 | 0.36 |
| 0.41 | 0.42 |
| 0.42 | 0.36 |
| 0.35 | 0.31 |
| 0.27 | 0.24 |

The white region W2 is determined here as a region along the black-body curve in the CIExyY colour space that ranges from colour temperature about 3500 K to about 20 000 K and is shifted upward at the upper limit by a value of about y=0.025 relative to the black-body curve and downward at the lower limit by about y=0.04. By comparison with W1, this region thus extends along a shorter section of the black-body curve and has a smaller deviation in the x and y coordinates from the black-body curve.

More preferably, the sightglass is characterized in that standard illuminant D65 light, after passing through the glass ceramic at a thickness of 4 mm, has a colour locus in the white region W3 that extends along the black-body curve in the CIExyY colour space from colour temperature of about 5000 K to about 20 000 K and is shifted upward at the upper limit by a value of about y=0.025 relative to the black-body curve and downward at the lower limit by about y=0.04. The white region W3 thus corresponds essentially to region W2, but begins only at a colour temperature of 5000 K. This colour region corresponds to daylight white and is correspondingly pursued by the human observer as particularly pure white:

| White region W3 | |
|---|---|
| x | y |
| 0.250 | 0.270 |
| 0.290 | 0.320 |
| 0.340 | 0.370 |
| 0.360 | 0.320 |
| 0.310 | 0.280 |
| 0.270 | 0.240 |

Changes in thickness can shift the colour coordinates of a glass ceramic. Preference is given to a glass ceramic where, for the entire thickness range of 2 to 8 mm, D65 standard illuminant light, after transmission, is in one of the white regions W1, W2 or W3. This can especially be satisfied by glass ceramics having a flat spectral transmission profile in the visible light range of 470 to 630 nm. In this wavelength range, the sensitivity of the human eye is particularly high. The flat transmission profile has the advantage that the colour coordinates of the glass ceramic depend to a minor degree on the thickness of the article.

Moreover, the flat transmission profile should preferably not contain any narrow absorption bands where there is a significant difference in the transmission values of adjacent wavelengths. In the wavelength range of 470 to 680 nm, the transmission values within all ranges encompassing 50 nm should preferably differ by less than a factor of 2.0, further preferably less than 1.7 and more preferably less than 1.5.

Such a glass ceramic is particularly advantageous because it can be used to produce sightglasses of different thickness without having to alter the composition of the glass ceramic. In the case of such glass ceramics, there are thus no remelting periods and associated production waste.

The flat profile of the transmission curve preferably features a ratio of the highest to the lowest spectral transmission value in the wavelength range of 470 to 630 nm of not more than 2.5, preferably not more than 2, further preferably not more than 1.8, at a thickness of 4 mm.

Such a colouring effect can be achieved, for example, in that the transparent coloured LAS glass ceramics contain 0.003-0.5% by weight of $MoO_3$ as colouring component. A minimum content of 0.003% by weight is required in the case of colouring by means of $MoO_3$ in order to obtain the reduced colour. If lower brightness is desired or, with increasing $Fe_2O_3$ or $V_2O_5$ contents, higher $MoO_3$ contents are required since these colouring components respectively move the colour coordinates into the yellow and orange/red.

Preferably, for adjustment of the colour locus, at least 0.01%, further preferably at least 0.03% and more preferably at least 0.05% by weight of $MoO_3$ is present. Since different valences of the Mo atom are present in the glass ceramic, the stated contents of the composition are based analytically on this compound. As the upper limit, the $MoO_3$ content is 0.5%, preferably 0.3%, further preferably 0.25% and more preferably 0.2% by weight. It has been found that the addition of $MoO_3$ brings about lowering of the glass viscosity and is favourable for the fusibility of the glass. However, particularly the reduced molybdenum oxide species also act as nucleating agents and can worsen the devitrification stability. It is therefore advantageous to limit the content.

The glass ceramics preferably contain less than 0.2% by weight of $Nd_2O_3$ since, in the case of this colour oxide, the low colour is achieved by narrow absorption bands at wavelengths of 526, 584 and 748 nm. With a high content of $Nd_2O_3$, this does not lead to a flat transmission profile, with the disadvantage that the colour coordinates of the glass ceramic differ relatively significantly from the standard illuminant used. The preferred content of $Nd_2O_3$ is less than 0.12% by weight and further preferably less than 0.06% by weight. More preferably, no $Nd_2O_3$ is used and the glass ceramic is free of $Nd_2O_3$ for technical purposes. In that case, generally less than 10 ppm of impurities is present. This effect occurs independently of the addition of other colorants. Therefore, the glass ceramics contain, independently of the other colouring constituents, preferably less than 0.2% by weight of $Nd_2O_3$.

In a preferred embodiment, the glass ceramics therefore contain 0.003-0.5% by weight of $MoO_3$ as colouring component and/or less than 0.2% by weight of $Nd_2O_3$. In a particularly preferred embodiment, the glass ceramics therefore contain 0.003-0.5% by weight of $MoO_3$ as colouring component and/or less than 0.2% by weight of $Nd_2O_3$.

Suitable glass ceramics have low, visually imperceptible scatter when the flame is viewed through them. In the measurement of haze, they are preferably characterized by a haze value of less than 10%, preferably less than 6%, further preferably less than 4% and more preferably less than 2.5%, at a thickness of 4 mm. The haze value can be measured with a commercial BYK Gardner "haze-gard plus" measuring instrument to standard ASTM D1003-13 with standard light C. In this standard, the haze is defined as the amount of light in % which is scattered by an average of more than 2.5° from the incident light beam. Haze thus corresponds to wide-angle scatter. The effect of high haze in a sightglass is that all articles behind the sightglass, irrespective of their distance from the sightglass, appear with reduced contrast. The articles thus have a milky/murky appearance.

It is particularly advantageous when the glass ceramics additionally have high clarity. Clarity is a measure of small-angle scatter, i.e. scatter in the angle range of less than 2.5°. The higher the clarity, the lower the small-angle scatter of a sightglass. The effect of a low clarity is that articles behind the sightglass have an indistinct or blurred appearance. The greater the distance of the articles from the glass, the more indistinct they seem. Since combustion chambers have a certain construction depth, the effect of a low clarity would thus be that articles such as logs close to the glass would be more sharply apparent than articles further away from the glass. Such an effect is undesirable. Therefore, the clarity of the glass ceramic at a thickness of 4 mm is at least 80%, preferably at least 90%, more preferably at least 95%.

The clarity value can likewise be measured with a commercial BYK Gardner "haze-gard plus" measuring instrument to standard ASTM D1003-13 with standard light C.

The progression of the transmission curve in the infrared and UV, in the case of the $MoO_3$-coloured glass ceramics, meets the demands for sightglasses for stoves.

Over the entire wavelength range of 950 nm to 2500 nm, the spectral transmission preferably does not go below 25%. Preferably, transmission in this region is at least 30% and more preferably at least 40% for thickness 4 mm.

At a wavelength of 1600 nm, the infrared transmission is preferably to be more than 40%. Preferably, infrared transmission is 45-85% at 1600 nm and a thickness of 4 mm. More preferably, infrared transmission at 1600 nm has values of 50-80%.

As is the case in established transparent uncoloured glass ceramics, in the far IR, a transmission window between about 3 and 4.3 μm is desired since the maximum intensity of the thermal radiation of flames is within this wavelength range. In the far infrared at 3700 nm, infrared transmission of at least 30%, preferably at least 40%, as in the case of established glass ceramics is advantageous.

For sightglasses for stoves, the stated transparency of infrared radiation is desired in order to deepen the experience of the stove fire. The glass ceramics that have been coloured with $MoO_3$ in the amount specified have the advantage over uncoloured glass ceramics and those coloured by means of $V_2O_3$ that they have somewhat stronger absorption of infrared radiation in the IR-A band of the near infrared. At the same time, however, they have the same transmission in the IR-B band. The IR-A band encompasses the wavelengths of 780 to 1400 nm. The IR-B band encompasses the wavelengths between 1400 and 3000 nm. These glass ceramics thus filter out the high-energy component of infrared radiation more strongly than the known glass ceramics. This is particularly advantageous since IR-A radiation can penetrate most intensely into human tissue and can cause skin irritation. These very specific absorption characteristics thus additionally contribute to operational safety of the stove. This is important particularly in the case of stoves with high combustion performance since the ratio of emitted IR-A radiation to IR-B radiation increases with the temperature of the flame.

In the ultraviolet light region, the glass ceramics of the disclosure are likewise to assure lasting protection. Transmission at wavelengths less than 300 nm is preferably to be less than 0.1%. This can especially be established via the addition of $Fe_2O_3$ to the composition of the glass ceramic since $Fe_2O_3$ absorbs UV light in the glass ceramic.

All figures relating to transmission in the IR and UV relate again to 4 mm polished samples.

It has been found that colouring with molybdenum oxide is also based on a redox process. In the crystallizable starting glass, the $MoO_3$ still colours relatively weakly. As is being assumed, the redox operation takes place in the ceramization: the molybdenum is reduced and the redox partner is oxidized, e.g. $Sn^{2+}$ to $Sn^{4+}$. The studies have shown that a stronger redox reaction is required for colouring with molybdenum than for colouring with vanadium. Therefore, preference is given to the more strongly reducing refining agent $SnO_2$ in contents of 0.05-0.8% by weight. Lower contents are less effective for the refining; higher contents promote unwanted devitrification in the course of shaping through Sn-containing crystals. Preferably, the $SnO_2$ content is 0.1% to <0.7% by weight. More preferably, the $SnO_2$ content is below 0.6% by weight. Colouring with other refining agents as redox partner than antimony oxide or arsenic oxide is found to be less effective.

Since colouring by vanadium oxide is a redox process, the redox state which is established in the melt in the glass also has an influence, for example by virtue of high melting temperatures and long residence times at high temperatures or additions of reducing components. A further influence on the colouring effect is possessed by the ceramization conditions. More particularly, high ceramization temperatures and long ceramization times lead to more intense colouring. Additions of other polyvalent components such as $Fe_2O_3$, $V_2O_5$, $CeO_2$, $TiO_2$ can, as well as their own colouring effect, influence the redox process and hence influence the molybdenum oxide colouring with regard to brightness and colour coordinates of the glass ceramic.

The $Fe_2O_3$ component reduces colouring by $MoO_3$ and moves the colour locus into the yellow. Higher contents than 0.25% by weight are therefore unfavourable. Preferably, the $Fe_2O_3$ content is not more than 0.15% by weight and more preferably not more than 0.1% by weight. Owing to the high costs of low-iron raw materials, it is uneconomic to reduce the $Fe_2O_3$ content to values below 0.005% by weight. A preferred lower limit is a content of greater than 0.03% by weight and more preferably greater than 0.05% by weight.

The $V_2O_5$ component moves the colour locus into the orange-red. The component is suitable for combination colouring with $MoO_3$. However, $V_2O_5$ colours more intensely, and so the content has to be limited in order to achieve the low colour of the disclosure. Higher contents than 0.02% by weight are therefore unfavourable. Preferably, the $V_2O_5$ content is less than 0.015% by weight and further preferably not more than 0.01% by weight. More preferably, no $V_2O_5$ is added to the composition and only impurities of a few ppm, usually 1-15 ppm, are present in the glass ceramic. The molybdenum oxide is thus preferably the main colourant, and the following component relationship (in % by weight) is applicable: $MoO_3/V_2O_5>1$, preferably >3, further preferably >5 and more preferably >10.

Since $V_2O_5$, even in very small amounts, moves the colour locus of transmitted light, the $V_2O_5$ content in the glass ceramic, even irrespective of the nature of the main colorant used, is preferably less than 0.02% by weight, more preferably less than 0.015% by weight, especially not more than 0.01% by weight, and most preferably, irrespective of the colorant, no $V_2O_5$ is added, and so it is present merely as impurity.

TiO$_2$ is an advantageous component for the nucleation. Since colouring is also assisted by the molybdenum oxide, meaning that the addition leads to lower values of light transmission Y, a minimum content of greater than 1.6% by weight is preferred. Preference is given to a minimum content of 2.5%, further preferably of 3.0% and more preferably of 3.5% by weight.

TiO$_2$ is thus the most important nucleator, and the following component relationship (in by weight) is applicable: TiO$_2$/ZrO$_2$>1, preferably >2, further preferably >3.

As well as the abovementioned polyvalent colouring components Fe$_2$O$_3$ and V$_2$O$_5$, it is also possible to use further colouring components, for example chromium compounds, manganese compounds, cobalt compounds, nickel compounds, copper compounds, tantalum compounds, niobium compounds, cerium compounds, tungsten compounds, bismuth compounds, selenium compounds, rare earth compounds, sulfide compounds, in order to adjust the colour coordinates of the glass ceramic. A special status is assumed here by polyvalent elements since they can additionally affect the redox operation that leads to colouring of the molybdenum. The content of colouring components is preferably limited to amounts of not more than 2% by weight, further preferably below 1% by weight. In addition, these compounds can lower transmission in the infrared.

However, the Cr$_2$O$_3$ content is preferably less than 0.02% by weight, more preferably less than 0.01% by weight, and the glass ceramic is especially free of Cr$_2$O$_3$ apart from unavoidable impurities.

In a preferred embodiment, the lithium aluminium silicate glass ceramic contains the following components (in % by weight based on oxide):

| | |
|---|---|
| Li$_2$O | 2-5.5 |
| Al$_2$O$_3$ | 16-26 |
| SiO$_2$ | 58-72 |
| MoO$_3$ | 0.003-0.5 |

The oxides Li$_2$O, Al$_2$O$_3$ and SiO$_2$ within the specified limits are necessary constituents of the high quartz and/or keatite mixed crystal phases.

The Li$_2$O content should be 2% to 5.5% by weight. The minimum content is required for the formation of crystals with low thermal expansion, but higher contents than 5.5% by weight in the production process frequently lead to unwanted devitrification. Preferably, the Li$_2$O content is greater than 2.8% by weight because the component enhances colouring with MoO$_3$. A content of 3% to 5% by weight leads to particularly good results. The selected Al$_2$O$_3$ content is 16-26% by weight. Higher contents are disadvantageous owing to the tendency to devitrification of mullite on shaping. The minimum content is 16% by weight. Preference is given to a range of 18-25% by weight.

The SiO$_2$ content should be not more than 72% by weight because this component significantly increases the viscosity of the glass. Preferably, this component is limited further to values of not more than 70% and further not more than 69% by weight. For good melting of the glasses and for low shaping temperatures, higher contents of SiO$_2$ are uneconomic. The minimum SiO$_2$ content should be 58% by weight, especially 60% by weight, because this is advantageous for the required use properties, for example chemical stability and thermal durability. Furthermore, scatter with short ceramization times is reduced.

In a further embodiment, the lithium aluminium silicate glass ceramic, or the article produced therefrom, preferably has a composition in % by weight based on oxide consisting essentially of:

| | |
|---|---|
| Li$_2$O | 2-5.5 |
| Σ Na$_2$O + K$_2$O | 0.1-<4 |
| MgO | 0-3 |
| Σ CaO + SrO + BaO | 0-5 |
| ZnO | 0-4 |
| B$_2$O$_3$ | 0-3 |
| Al$_2$O$_3$ | 16-26 |
| SiO$_2$ | 58-72 |
| TiO$_2$ | 1.5-5.5 |
| ZrO$_2$ | 0-2.5 |
| SnO$_2$ | 0-<0.7 |
| Σ TiO$_2$ + ZrO$_2$ + SnO$_2$ | 3-6.5 |
| P$_2$O$_5$ | 0-5 |
| MoO$_3$ | 0.01-0.3 |
| Fe$_2$O$_3$ | 0.008-0.025 |
| V$_2$O$_5$ | 0-0.02 |

The expression "consists essentially of" means that the components listed are to make up at least 96%, generally 98%, of the overall composition.

The addition of the alkalis Na$_2$O, K$_2$O and of the alkaline earths CaO, SrO, BaO and of B$_2$O$_3$ improves fusibility and devitrification stability in the shaping of the glass. Since these components are not incorporated into the crystal phases but remain essentially in the residual glass phase of the glass ceramic, their contents have to be limited. Excessively high contents increase the thermal expansion of the glass ceramic impermissibly and impair the crystallization characteristics in the transformation of the crystallizable starting glass to the glass ceramic, here particularly at the expense of short ceramization times. Moreover, higher contents have an unfavourable effect on the time/temperature durability of the glass ceramic. The sum total of the alkalis Na$_2$O+K$_2$O is to be at least 0.1% and preferably at least 0.2% by weight. An advantageous upper limit is less than 4% by weight, preferably less than 3% by weight.

The addition of the alkalis Na$_2$O, K$_2$O and of the alkaline earths CaO, SrO, BaO and of B$_2$O$_3$ improves fusibility and devitrification stability in the shaping of the glass. Since these components are not incorporated into the crystal phases but remain essentially in the residual glass phase of the glass ceramic, their contents have to be limited. Excessively high contents increase the thermal expansion of the glass ceramic impermissibly and impair the crystallization characteristics in the transformation of the crystallizable starting glass to the glass ceramic, here particularly at the expense of short ceramization times. Moreover, higher contents have an unfavourable effect on the time/temperature durability of the glass ceramic. The sum total of the alkalis Na$_2$O+K$_2$O is to be at least 0.1% and preferably at least 0.2% by weight. An advantageous upper limit is less than 4% by weight, preferably less than 3% by weight.

Said alkalis, B$_2$O$_3$ and alkaline earth metals, apart from in the residual glass phase, also accumulate between the crystals at the surface of the glass ceramic. The ceramization forms a vitreous surface layer of thickness about 200 to 1000 nm that is virtually free of crystals that are enriched in these elements and depleted of lithium. This vitreous surface layer has a favourable effect on the chemical stability of the glass ceramic.

The optional addition of B$_2$O$_3$ increases devitrification resistance. Higher contents than 3% by weight are unfavourable since they increase the scatter of the glass ceramic. Preferably, a maximum of 2% by weight of $B_2O_3$ is present.

Further components that can be incorporated into the high quartz mixed crystals are MgO, ZnO and $P_2O_5$. Owing to the problem of unwanted crystal phases such as zinc spinel (gahnite) in the ceramization, the ZnO content is limited to values of not more than 4% by weight, preferably not more than 3% by weight. The MgO content is limited to not more than 3% by weight, preferably up to 1.5% by weight, because it otherwise impermissibly increases the coefficient of expansion of the glass ceramic. The addition of $P_2O_5$ can be up to 5% by weight and is preferably limited to 3%. The addition of $P_2O_5$ is favourable for devitrification resistance. Higher contents have an unfavourable effect on acid resistance and short ceramization times.

$TiO_2$, $ZrO_2$ and $SnO_2$ are envisaged as nucleators. The total content should be 3% to 6.5% by weight. The minimum amount is required in order that the nucleation forms seed crystals in high density, on which the high quartz mixed crystals grow in a high number, associated with small crystallite sizes. Higher contents than a total of 6.5% by weight worsen the devitrification resistance in the course of shaping. This is particularly true of the $SnO_2$ component, which is preferably limited to values of less than 0.7% by weight, and the $ZrO_2$ component, which is preferably limited to 2.5% by weight. The $TiO_2$ component is a very effective constituent which is important for short ceramization times. The $TiO_2$ content is to be at least 1.5% by weight and at most 5.5% by weight. Higher contents than 5.5% by weight are disadvantageous for devitrification resistance and can induce unwanted Ti-containing crystal phases, for example rutile, in the glass ceramic.

For economically viable production, the crystallizable starting glass should have good fusibility and refinability and high devitrification resistance, and be ceramizable within short times. In order to lower the viscosity of the glass melt, it has been found to be necessary to further limit the maximum content of $SiO_2$, $Al_2O_3$, $ZrO_2$, while the minimum contents of alkalis $Na_2O+K_2O$, alkaline earths $CaO+SrO+BaO$ are chosen at higher levels.

In order to further optimize the demands on short ceramization times and good devitrification resistance, the contents of the nucleating agents should be limited and the maximum contents of $Na_2O+K_2O$, $B_2O_3$, $CaO+SrO+BaO$ and $P_2O_5$ should be limited.

Preferably, the lithium aluminium silicate glass ceramic in this regard has a composition in % by weight based on oxide consisting essentially of:

| | |
|---|---|
| $Li_2O$ | 3-5 |
| Σ $Na_2O + K_2O$ | 0.2-<3 |
| MgO | 0-1.5 |
| Σ $CaO + SrO + BaO$ | 0.2-4 |
| ZnO | 0-3 |
| $B_2O_3$ | 0-2 |
| $Al_2O_3$ | 18-24 |
| $SiO_2$ | 60-69 |
| $TiO_2$ | 1.5-5.5 |
| $ZrO_2$ | 0-2.5 |
| $SnO_2$ | 0.1-<0.7 |
| Σ $TiO_2 + ZrO_2 + SnO_2$ | 3.5-6.3 |
| $P_2O_5$ | 0-3 |
| $MoO_3$ | 0.01-0.25 |
| $Fe_2O_3$ | >0.03-0.015 |
| $V_2O_5$ | 0-<0.01 |

More preferably, $ZrO_2$ is involved in the nucleation and the $ZrO_2$ content is 0.3-<2.2% by weight. This is advantageous for the demands that are placed on the use of the glass ceramics, for example chemical stability.

The glass ceramics of the disclosure optionally contain additions of chemical refining agents such as $As_2O_3$, $Sb_2O_3$, $CeO_2$, and of refining additions such as manganese oxide, sulfate compounds, halide compounds (F, Cl, Br) in total contents up to 2.0% by weight.

Preferably, the glass ceramics for technical purposes are free of the arsenic oxide and antimony oxide refining agents that are critical from an environmental point of view. This means that the glass ceramics contain these components only as raw material impurities. The two components are each present as an impurity in contents of less than 1000 ppm, preferably in contents of less than 500 ppm.

Preference is also given to dispensing with the addition of halide compounds as refining aids. On melting and shaping, these form corrosive compounds such as HF, HCl and HBr, which are disadvantageous for the lifetime of the aggregates. The glasses and glass ceramics are therefore free of F, Cl, Br apart from unavoidable traces, and the individual contents thereof are less than 500 ppm.

Compounds of a multitude of elements, for example F, Cl, the alkalis Rb, Cs, or elements such as Mn, Hf are customary impurities in the batch raw materials used on the industrial scale. Other compounds, for example those of the elements W, Nb, Ta, Y, rare earths, Bi, V, Cr, Ni, can be present in small proportions, typically in the ppm range.

The water content of the crystallizable glasses for production of the glass ceramics, depending on the choice of batch raw materials and the process conditions in the melt, is preferably between 0.015 and 0.06 mol/l. This corresponds to β-OH values of 0.16 to 0.64 $mm^{-1}$. In the transformation to the glass ceramic, there is a change in the IR band which is used to determine the water content. For measurement-related reasons, this increases the β-OH value for the glass ceramic by a factor of about 1.6 without any change in the water content. This and the method for determination of the β-OH values is described in EP 1074520 A1.

These compositions permit favourable manufacturing properties for economically viable production, such as inexpensive batch raw materials, low melting and shaping temperatures, good devitrification resistance and short ceramization times.

Low melting and shaping temperatures are assured by relatively low viscosity of the glass melt at high temperatures. Characteristic parameters for this are the temperature at which the viscosity of the glass melt is $10^2$ dPas, and the working temperature $V_A$ at which the viscosity of the glass melt is $10^4$ dPas. The $10^2$ temperature for the glasses of the disclosure is preferably less than 1775° C., preferably less than 1760° C., and the working temperature is preferably below 1335° C., preferably below 1325° C. Since a low glass viscosity also promotes the ascent of bubbles and hence refining, a low glass viscosity is also advantageous for bubble quality.

The crystallizable glass has adequate devitrification resistance on shaping from the melt. In shaping on contact with the shaping material (e.g. precious metal in the drawing die in the rolling process), there is no formation of crystals in the glass that are critical for the strength of the glass ceramic and visually perceptible. The limiting temperature below which there is critical devitrification, i.e. the upper devitrification limit (UDL), is preferably below the working temperature $V_A$ and preferably 10° C. lower. This minimum differential defines an adequate process window for the shaping process.

A particularly advantageous process window $V_A$-UDL is at least 20° C. The differential $V_A$-UDL is thus a measure of devitrification resistance.

The crystallizable glasses are transformed to the glass ceramics by the multistage temperature process described further down.

In a first embodiment, the glass ceramic is transparently coloured and contains high quartz mixed crystals as main crystal phase.

For the minimization of scatter, it is advantageous to minimize the crystallite sizes. An upper limit which is preferred owing to increasing scatter is an average crystallite size smaller than 70 nm, preferably smaller than 60 nm.

The crystal phase component of the high quartz mixed crystals in the glass ceramic is preferably at least 50% by weight and preferably at most 80% by weight. This range is advantageous in order to obtain the desired mechanical and thermal properties of the glass ceramic. A proportion of 55-75% by weight is particularly preferred.

Preferably, the average thermal expansion in the region of the use temperatures, i.e. in the range of 20 to 700° C., differs at most by $0.5 \cdot 10^{-6}$/K from the zero expansion.

In another embodiment, the transparent coloured glass ceramic contains keatite mixed crystals as the main crystal phases. The average crystallite size is preferably smaller than 150 nm in order that the scatter does not exceed the permissible haze values. The crystal phase content is preferably more than 55% by weight.

The glass ceramics can contain both types of crystal. For economic reasons, it is advantageous when the same composition of the crystallizable lithium aluminium silicate glass can be used to produce both transparent coloured glass ceramics with high quartz mixed crystals as main crystal phases and glass ceramics with keatite mixed crystals as main crystal phases.

Sightglasses of the disclosure preferably have a thickness of at least 2 mm, preferably at least 3 mm, and of at most 20 mm, preferably at most 10 mm, more preferably at most 6 mm. Strength is impaired in the case of lower thicknesses; higher thicknesses are less economic owing to the higher material requirement.

Suitable shaping methods for the glasses are especially rolling, drawing and floating. The preferred shaping process from the glass melt is that via two rolls since this process has advantages with regard to devitrification owing to the more rapid cooling.

The sightglasses here cancan be formed flat. They cancan especially be smooth on both sides. In addition, they cancan also be three-dimensionally shaped. For example, it is possible to use folded, angled or curved geometries. The glasses cancan be in rectangular form or in other forms and, as well as flat regions, have three-dimensionally formed regions, for example lands, grooves or areas that have been introduced by rolling as elevations or depressions. The geometric deformations of the plates are undertaken in the hot shaping operation, for example via structured shaping rolls, or by downstream hot shaping on the starting glasses, for example by means of burners, infrared sources, or by gravity lowering. The downstream hot forming generally takes place immediately prior to the ceramization.

In order to increase three-dimensional viewing into the stove oven, the sightglasses cancan be used in round-curved or angled and curved form. The round-curved stove sightglasses cancan be produced by what is called gravity lowering. For angled and curved glasses, there are special, for example gas-driven, bending machines or robot-guided bending machines. Angled and curved sheets are especially understood to mean sheets having at least two flat regions, where two adjacent flat regions are joined to one another via an axially curved region.

By drilling or grinding and optionally subsequent polishing, it is also possible to apply geometries such as holes or facets. In the course of ceramization, supporting ceramic shapes, for example flat underlays, are employed in order to avoid uncontrolled changes in geometric shape. Subsequent polishing of one or both sides is optionally possible if required by the application.

A process for producing a transparent coloured lithium aluminium silicate glass ceramic containing 0.003-0.5% by weight of $MoO_3$ as colouring component or less than 0.2% by weight of $Nd_2O_3$ is characterized in that the temperature of the glass melt reaches at least 1600° C. This temperature of the glass melt is required to establish a sufficient reduced state of the starting glass for the ceramization. This is required in order that sufficient concentrations of polyvalent components are present in the lower oxidation state, for example $As^{3+}$, $Sn^{2+}$, $Ti^{3+}$ that are capable of converting the molybdenum to the colouring reduced state in the ceramization, in which they are oxidized as redox partners. In the case of a glass melt in very reduced form, some of the molybdenum cancan already be reduced and colour the glasses; in general, the starting glasses are still largely uncoloured. Preferably, the melting temperature is at least 1640° C.

The mechanism of establishment of the reduced state at high temperatures is that $O_2$ refining bubbles are formed, which ascend within and leave the glass melt, with reduction of the latter.

As shown in document WO 2010102859 A1, the redox state of the crystallizable starting glass can be determined by measuring the partial oxygen pressure of the glass as a function of temperature, $pO_2(T)$.

It has been found that a specifically established redox state of the crystallizable starting glass which is undertaken in the melt has a favourable effect on the desired transmission profile of the glass ceramic. This enhances the colouring effect of the molybdenum oxide, and small proportions are required for the same colouring, which is economically advantageous.

In the case of a crystallizable glass that has been excessively reduced in the melt, there are greater proportions of molybdenum in a lower valency, and these lead to uncontrolled nucleation and crystallization in the glass. These are usually high quartz mixed crystal phases. In the process of the disclosure, the glass is thus reduced only to such an extent that no unwanted crystallization occurs in the crystallizable glass.

The following process parameters are suitable for reducing the glass: the addition of reducing agents in pulverulent and/or liquid form to the starting batch. Suitable for this purpose are metals, carbon and/or oxidizable carbon or metal compounds, for example Al or Si powder, sugar, charcoal, carbon black, SiC, TiC, MgS, ZnS; gaseous reducing agents, for example forming gas, are also suitable; the reduction of the addition of nitrate compounds in the batch, the increase in the shard component in the batch recipe, high melting and refining temperatures and the residence time of the melt at high temperatures.

In addition, the process for producing the glass ceramics is characterized by the steps of: providing a batch recipe for industrial raw materials containing 20% to 80% by weight of shards; melting the batch recipe and refining at temperatures that reach at least 1600° C.; establishing a reduced state in the glass in which no crystals are formed in the cooled glass;

cooling the glass melt and shaping at temperatures close to the working temperature $V_A$, producing the desired shape of the article; cooling in an annealing oven to room temperature, with removal of unwanted stresses in the glass.

The batch recipe is such as to give rise to, after the melting, a glass having the composition and properties of the disclosure. The addition of shards at 20% to 80% by weight promotes melting, and it is possible to obtain higher tank throughputs. Refining can be effected in conventional melt tanks at maximum temperatures of the glass melt of less than 1750° C., or with an additional high-temperature refining unit at higher maximum temperatures.

In the shaping operation, preference is given to the established glass technologies, such as casting, pressing, rolling, drawing, especially down-draw, and floating. For avoidance of stresses, the glasses are cooled down to room temperature in a cooling oven after the hot forming. This glass strip, after assurance of quality with regard to volume and surface defects, is used to produce plates of the desired size.

The next process step is the transformation of the crystallizable glass to the glass ceramic. This ceramization is conducted on flat or three-dimensional, usually ceramic, underlays in order to avoid uncontrolled changes in geometric shape. Subsequent polishing of one or both sides is optionally possible if required by the application. In the process of the disclosure, for ceramization, the thermally annealed crystallizable starting glass is converted to the glass ceramic at maximum temperatures of 1100° C. Preferably, the maximum temperature is less than 980° C. Low maximum crystallization temperatures are advantageous for low values for average crystal sizes and associated low scatter.

The crystallizable glass can be ceramized in a roller kiln. In this ceramization, the thermally annealed crystallizable starting glass is heated to the temperature region of about 680° C. within 3 min to 60 min. The required high heating rates can be implemented on the industrial scale in roller kilns. This temperature region of about 680° C. corresponds roughly to the transformation temperature of the glass. Above this temperature up to about 800° C. is the range with high nucleation rates. The temperature runs through the nucleation range over a period of 10 minutes to 100 minutes. Thereafter, the temperature of the glass containing crystallization seeds is increased to a temperature of 850 to 1200° C. within 5 minutes to 80 minutes, said temperature being notable for high crystal growth rates of the crystal phases. In the production of glass ceramics with high quartz mixed crystals as main crystal phase, the temperature is limited to a maximum of 970° C. This maximum temperature is maintained for up to 60 minutes. This homogenizes the microstructure of the glass ceramic and establishes the optical, physical and chemical properties. The glass ceramic obtained is cooled down to room temperature within less than 150 minutes. The cooling down to about 700° C. is preferably conducted at a slower rate. In the production of glass ceramics with keatite mixed crystals as the main crystal phase, the cooling is preceded by an additional step for transformation of the crystal phase within the temperature range of up to 1200° C. The higher the temperature chosen and the longer it is maintained, the stronger the light scatter resulting from the growth of the keatite crystals will be.

By virtue of the choice of the composition with $MoO_3$ for colouring, via the establishment of the redox state of the crystallizable glass and by virtue of the production parameters in the melt and ceramization, the transparent coloured glass ceramics described can be used to create a wide range of light transmittance which, according to the use, preferably at thickness 4 mm, has values of 0.1% to 50%.

The thermal expansion of these glass ceramics can be adjusted as described via the composition and the ceramization. Preferably, the coefficient of thermal expansion CTE within the temperature range between 20 and 70° C. is adjusted to a value in the range of −2.5 to +2.5×10$^{-6}$/K, preferably in the range of −1.5 to +1.5×10$^{-6}$/K and more preferably in the range of −0.5 to +0.5×10$^{-6}$/K. The coefficient of thermal expansion CTE in the temperature range between 20 and 700° C. is also referred to as CTE $α_{20/700}$ or simply just as $α_{20/700}$. By virtue of the choice of the CTE within one of these ranges, the glass ceramic especially has very good durability with regard to high operating temperatures and with regard to thermal cycling stresses.

The described glass ceramics of the present disclosure fulfil the demands on transparency and scatter, have low chromaticity, and meet all the other demands that are made on their use. These include low thermal expansion, high chemical stability, mechanical strength, thermal durability and high temperature/time durability with regard to changes in these properties.

It is possible to apply coatings to the substrate on the inner and/or outer face of the sightglass. The known different types of coatings, for example with organic or inorganic decorative colours, lustre colours, silicone- and sol-gel-based colours, sputtered layers, metallic, oxynitride and oxycarbide layers and so forth are usable and combinable in accordance with the prior art. Layers cancan also be applied one on top of another.

Owing to the colour neutrality, sightglasses of the disclosure can also be used to cover one or more displays. The display devices consist of light-emitting electronic components, for example of white or coloured light-emitting diodes, RGB-LEDs, OLEDs, LCDs, fluorescent displays, projectors, fluorescent tubes, displays and screens. All forms of displays are possible, including dot displays and two-dimensional displays, including 7-segment displays. The emission spectra of the radiative displays cancan be monochromatic or be polychromatic and have multiple maxima and broad ranges, such that the displays have a coloured, for example violet, blue, purple, red, green, yellow, orange, or white appearance. Owing to the low chromaticity of the glass ceramic, black-white and colour displays or screens can be viewed without disruptive colour distortion. Preference is given to dispensing with the mounting of colour filters or colour layers applied to the inner face. In order to improve the visibility of the displays, these cancan be adhesive-bonded with refractive index-adapted polymers, or masks cancan be mounted. Anti-reflection, scatter, diffuser or anti-glare layers cancan be applied to the substrate in the region of the display in order to improve the visibility of the display.

In addition, sightglasses of the disclosure can also be used simultaneously to cover control, sensor, driving and operating elements. As well as the displaying of operating states of the stove, it thus becomes possible for the user to operate the stove directly at the sightglass. Control can be effected via touch-sensitive screens. The sightglass cancan contain regions having lower thickness for the displays. Since transmission is exponentially dependent on the thickness of the substrate, the brightness of the display, for example in the case of a screen, is significantly increased. However, the other regions of the sightglass are preferably thicker in order that they have the light transmission of the disclosure.

Owing to the low electrical conductivity of the glass ceramic, it is also possible to mount electromagnetic transmitters and receivers behind the sightglass. These can be utilized, for example, to connect the stove by wireless connection to the Internet or a mobile electronic device such as a mobile phone. Useful examples for this purpose include WLAN, Bluetooth or ZigBee connections. The stove cancan likewise be connected via such a connection to a smart home control system. In this way, the operating parameters of other domestic systems, for example the heating or ventilation, can be matched to the operation of the stove. In addition, the operation of the stove can be driven with reference to sensors such as temperature sensors or fire detectors that are distributed in the environment of the stove.

It is likewise possible to mount sensors in the interior of the stove, the measurements from which are transmitted wirelessly to a control system. Since a stove can have a metallic housing impermeable to electromagnetic radiation, a correspondingly permeable sightglass is particularly advantageous for such a connection.

The sightglasses of the disclosure are suitable, for example, for any mode of firing for stoves. This especially includes stoves fired by means of logs, wood pellets, gas or liquid fuel. Since the sightglasses have excellent thermal stability, they are also suitable for stoves of any power class or calorific value class.

In the case of stove or oven sightglasses, coatings cancan be desired, for example for opaque coverage at the edge of the glasses. Such coatings are typically applied on the inner face of the substrate. One purpose that they serve there is to laminate substrate bonds to frame constructions.

For opaque coverage at the edge, opaque enamel layers are typically used. An enamel is a coating which is produced by baking of a mixture of at least one pigment and at least one glass frit. Typically, an enamel is applied by means of screenprinting or other printing methods. In the case of particularly high demands on opacity, the enamel layer can also be produced in particularly thick and opaque form by multiple overprinting. An enamel layer can be provided either on one side, preferably the inner face, or on both sides.

For use on a sightglass, the enamel has to meet a multitude of specific demands. As well as sufficiently high opacity, it has to be stable to infiltration by liquids in order that the adhesive cannot penetrate into the layer prior to curing and hence produce bonding sites that are visible from the other side. It has to be stable to temperatures and thermal cycling stresses that occur in a stove and have high chemical stability to combustion products and cleaning compositions.

One advantage in the case of use of a sightglass of the disclosure in combination with such an opaque enamel is that the reduced transmission of the substrate lowers the demands on the enamel. An enamel having poor adhesive visibility, for example in combination with an uncoloured sightglass, is unsuitable for such sightglasses. In combination with a sightglass of the disclosure, however, the effect of the reduced transmission of the sightglass can be that the adhesive visibility is additionally reduced, and so such an enamel is suitable for use. In the same way, the demands on the opacity and colour locus of the coating also become less stringent. This makes it possible also to use less costly enamel coatings.

In a preferred embodiment, the sightglass has an anti-reflection layer on one side, preferably on both sides. An anti-reflection layer is understood here to mean a layer or a stack of multiple layers that reduces the total reflection of the substrate in the visible spectral range between 380 nm and 780 nm. The refractive index of LAS glass ceramics in the visible is roughly between 1.5 and 1.6. This leads to reflection of visible light in an order of magnitude of about 4% per substrate side. Since both sides of the substrate contribute in the same way to reflection, it is advantageous when both sides have an anti-reflection layer. This reflected light reduces the visibility of the flames, especially when the stove is being operated in a bright environment. An anti-reflection layer thus further improves the visibility of the flames.

Anti-reflection layers can consist of a layer having a refractive index lower than that of the glass ceramic. Alternatively, anti-reflection layers can consist of a stack of layers consisting alternately of a material with low refractive index and a material with high refractive index. By suitable choice of the refractive indices and layer thicknesses, it is thus possible to produce interference-optical layers that reduce total reflection. Materials used for this purpose are frequently $SiO_2$ as material with low refractive index and $TiO_2$ as material with high refractive index.

In a further preferred embodiment, the glass has an infrared-reflective coating on one or both sides. An infrared-reflective coating is understood here to mean a layer or a stack of layers that increases the reflection of electromagnetic radiation with a wavelength of more than 780 nm and alters the reflection of light in the visible region to a minimum degree. More particularly, such a layer is to increase the reflection for the thermal radiation emitted by the flame. By means of such a layer, a portion of the thermal radiation can be reflected back into the combustion space. This leads to an increase in the flame temperature and hence to an increase in the combustion efficiency. At the same time, it leads to a reduction in the thermal radiation emitted through the sightglass into the exterior. This can prevent overheating of the exterior.

However, the increase in the flame temperature, as described above, increases the proportion of IR-A radiation in the thermal radiation from the stove. Therefore, it is a further positive aspect of the disclosure that the glass ceramics described selectively absorb IR-A radiation and hence increase the operational safety of the stove. This effect occurs to a particularly significant degree for sightglasses with infrared-reflective coating.

Preferably, the infrared-reflective coating has been applied on the inner face of the substrate. In that case, less thermal radiation passes through the substrate. Consequently, less thermal radiation is also absorbed in the substrate, and so the sightglass is heated to a lesser degree in operation. As a result, the outer face of the sightglass remains cooler and the risk of injury through burning on contact with the sightglass falls.

Suitable materials for infrared-reflective coatings are especially transparent conductive oxide (TCOs) such as indium tin oxide (ITO), aluminium-doped zinc oxide (AZO), antimony-doped tin oxide (ATO), indium gallium zinc oxide (IGZO) or fluorine-doped tin oxide (FTO). These materials have the necessary thermal stability. Furthermore, it is also possible to provide further layers between the substrate and the infrared-reflective layer. Such layers can, for example, be barrier layers against the diffusion of constituents of the glass ceramic into the coating. Alternatively or in combination, there can be additional layers for anti-reflection purposes in the visible spectral region or adjustment of the colour locus of the coating.

Both anti-reflection layers and infrared-reflective layers are generally layers that are active in interference optics. This means that these layers have a coloured appearance even though they do not absorb any light. If such a layer is provided on the inner face of a transparent uncoloured glass ceramic and an opaque coating is additionally provided in the edge region, there can be a change in the colour of the layer in the region of the enamel compared to the regions without enamel. This is undesirable because this gives rise to an inhomogeneous overall impression of the sightglass. In the case of an identical construction using a sightglass of the disclosure, the coloured glass ceramic attenuates these colour differences by virtue of its absorption, such that these are less visible or even no longer visible at all.

Therefore, the sightglass, in a preferred embodiment, at least on the inner face, has at least one anti-reflection or infrared-reflective coating and an opaque coating. The opaque coating has preferably been applied to the anti-reflection or infrared-reflective coating.

In a further preferred embodiment, the sightglass, preferably on its outer face, has a partly reflective coating. A partly reflective coating is understood here to mean a coating that increases the overall reflection of the substrate in the visible spectral region and has a light transmittance of at least 10%, preferably at least 20%, especially at least 45%. These can be, for example, thin metallic layers, layers with an oxidic matrix and metal particles dispersed therein, or interference-optical layers of metal oxides. The light transmittances of partly reflective coating and substrate have to be matched to one another here such that the resulting light transmittance is high enough to assure good visibility of the flame. In general, the resulting light transmittance chosen will have to be higher than in the case of a sightglass without reflective coating since flame visibility, owing to the reflected ambient light, is generally poorer as a result of the use of reflective layers.

Sightglasses for stove ovens can exist in a multitude of different dimensions. The area of such a sightglass varies from about 0.01 m², for example small side glasses, up to about 1.3 m² for large sightglasses. Owing to improved colour neutrality, the sightglass of the disclosure can also take the form of part of a continuous door or front facing of a stove and hence can be present as a larger work surface or kitchen table with dimensions above 1.3 m² and with improved interactive functions.

The sightglass, especially the substrate, is not subject to any particular restrictions in terms of its size and can in principle be produced in any dimensions customary in the glass industry. As well as the abovementioned sizes, the sightglass can be produced in any GEN size GEN 1 to GEN 10.5:

|  | Length [mm] | Width [mm] |
|---|---|---|
| GEN 1 | 300 | 400 |
| GEN 2 | 370 | 470 |
| GEN 3 | 550 | 650 |
| GEN 3.5 | 600 | 720 |
| GEN 4 | 680 | 880 |
| GEN 4.5 | 730 | 920 |
| GEN 5 | 1100 | 1250-1300 |
| GEN 6 | 1500 | 1800--1850 |
| GEN 7 | 1870 | 2200 |
| GEN 7.5 | 1950 | 2250 |
| GEN 8 | 2160 | 2460 |
| GEN 10 | 2880 | 3130 |
| GEN 10.5 | 2940 | 3370 |

The pane thickness here is typically either 4 mm or 5 mm. But other pane thicknesses, for example in the range of 2 mm to 10 mm, are likewise possible. The pane thickness is chosen, for example, according to pane area, installation situation or use.

Sightglasses for stove ovens can be produced in different geometries. As well as the flat formats, it is also possible to use panes with angled or round shapes. All these geometries can be provided with a print or one of the coatings mentioned. For this purpose, flat glasses are generally first produced, then the coating is applied and the pane is subsequently shaped. According to the coating method and geometry of the panes, the panes can also first be shaped and then coated. For the shaping of the pane, it has to be heated to correspondingly high temperatures. This heating can simultaneously be utilized for the purpose of baking coatings such as enamel layers and/or of ceramizing the pane. Since the ceramization results in an abrupt rise in viscosity of the pane, the shaping should precede the ceramization.

With the glass ceramics described above, it is possible to produce sightglasses with very high optical quality and hence very good flame visibility.

In a further preferred embodiment, the substrate is optimized such that it causes minimum scatter for visible light. Aside from the crystal microstructure of the glass ceramic, what this means is, for example, that the substrate has less than 3 bubbles per kg of glass ceramic, preferably less than 2 bubbles per kg, more preferably less than 1 bubble per kg, based on a bubble size of at least 100 μm in diameter.

Furthermore, it is advantageous when the substrate consists of glass ceramic having minimum intrinsic light scatter at the crystallites present. This is the case especially when the crystallites have an average size of less than 250 nm in diameter and the difference in refractive index between crystalline phase and residual glass phase is at a minimum. Both parameters can be greatly influenced by the choice of material composition and the ceramization conditions, especially the slope of the temperature ramps, duration of ceramization and maximum temperature during the ceramization.

In a preferred embodiment, the substrate has a surface quality matched to the increase in quality of the view of the flames. For example, the outer face or both sides can have been polished and hence have very low surface roughness, which advantageously allows a further reduction in the scatter of the view of the flames. In this way, particularly high contrast values can be achieved for the view of the flames.

By suitable choice of the composition and the production parameters for the glass ceramic, it is also possible to form a smooth, vitreous surface layer on the surfaces of the substrate, especially on the outer and inner faces. A vitreous surface layer of an LAS glass ceramic is understood to mean a layer directly at the surface which, by contrast with the interior, i.e. the microstructure beneath this boundary layer, does not have the crystals that are typically of average size 20 nm to 100 nm but is predominantly amorphous. Such a surface layer can preferably be sufficiently smooth that subsequent polishing is unnecessary. Vitreous surface layers also have, by comparison with the volume of the glass ceramic, a deficiency of lithium and typically a thickness of less than 5 μm, preferably in the range from about 50 to 1500 nm.

The vitreous surface layer can also have a lower refractive index than the crystalline interior. In this way, the vitreous boundary region can also have an anti-reflective effect, such that it is possible to dispense with the additional application of an anti-reflection layer. This enables a distinct reduction in costs through saving of material and time. The formation of the vitreous boundary region can particularly advantageously increase the transparency of the sightglass by about 1% absolute in the visible wavelength range.

All remarks apply both to polished and unpolished glass ceramics, even though it is known that surface treatments such as polishing can lead to differences in light reflection.

Sightglasses of the disclosure that are suitable for stoves are likewise suitable for use as baking oven sightglass or as sightglass in barbecues. For baking ovens and barbecues, the demands applicable are essentially the same or at least very similar to those for stoves. The illuminated food being cooked corresponds here to the visibility of the flame in the stove. The colour neutrality of the glass ceramic enables the assessment of the cooking state of the food being cooked without opening of the cooking space and hence without energy loss. This is particularly important because the cooking state in baking and grilling is frequently determined via colour, for example the degree of browning of the food being cooked.

The thermal stability of the sightglass is just as important for baking ovens, especially those with pyrolysis cleaning function, and barbecues as it is for stove sightglasses. In the case of baking ovens, the sightglasses are preferably disposed in the door.

The sightglasses are suitable for any type of barbecue. They are more preferably used for gas barbecues. In barbecues, the sightglasses are preferably disposed in the barbecue lid.

For baking ovens and barbecues, the preferred thickness of the sightglass is between 2 and 8 mm.

The present disclosure is illustrated further by the examples which follow.

DETAILED DESCRIPTION

Figure 1A:
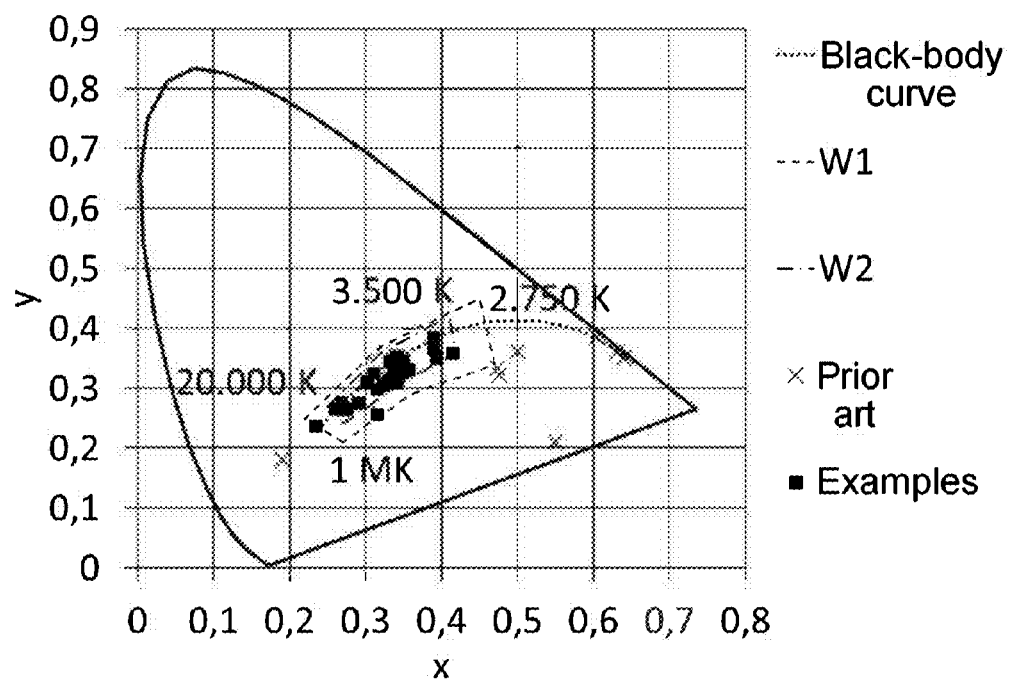
FIGS. 1a and b show chromaticity diagrams of the CIExyY colour space with 2° standard observer (CIExyY-2°).
Figure 1B:
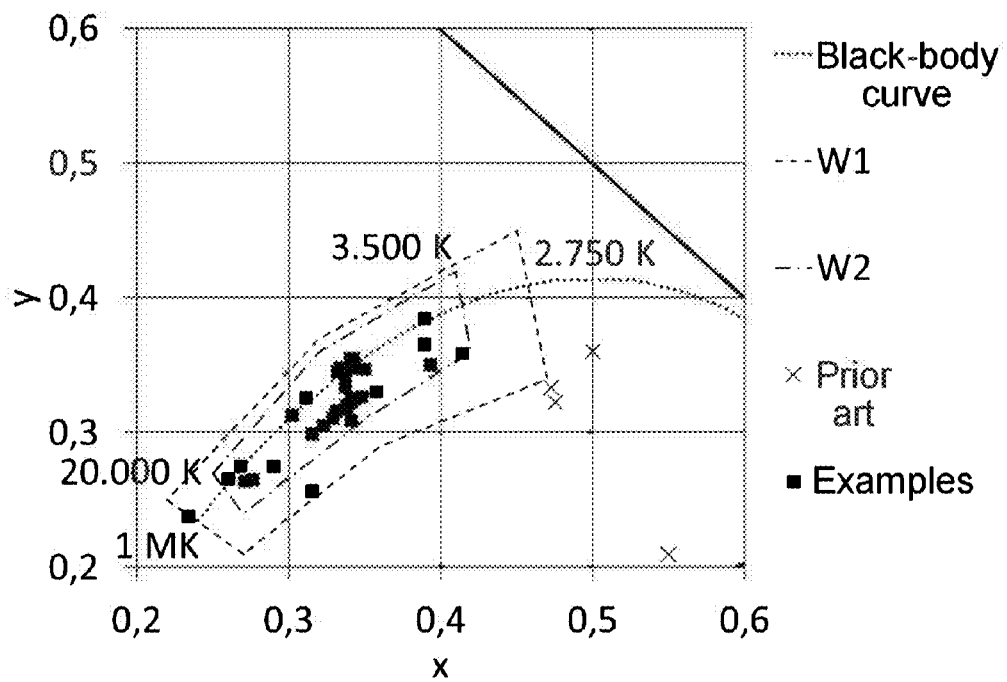
Figure 2:
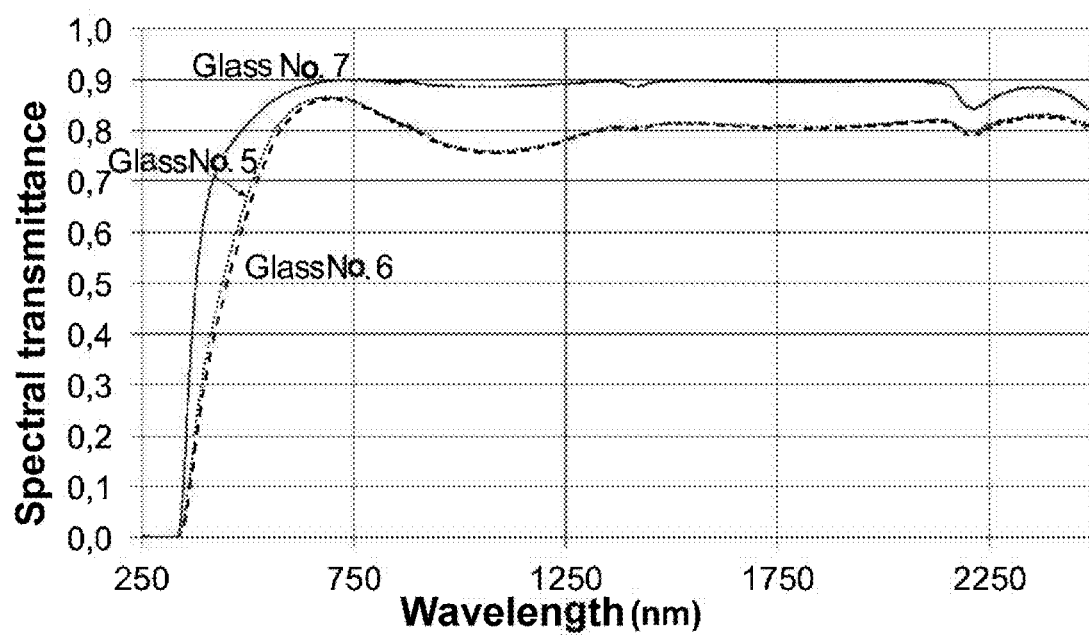
FIG. 2 shows the transmission curves for the glass of Examples 5, 6, and 7.
Figure 3A:
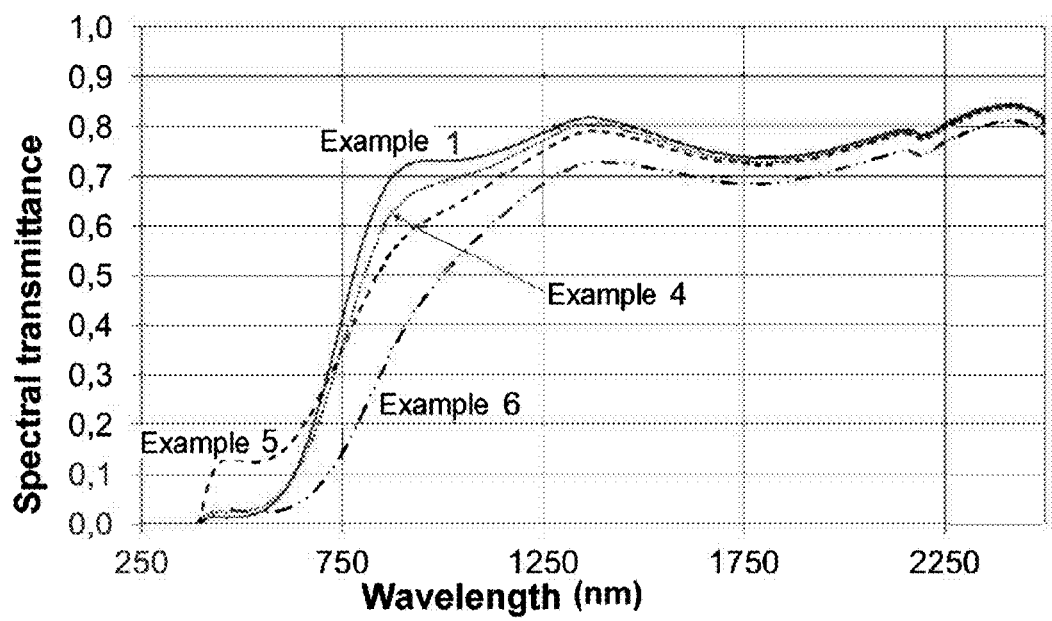
FIGS. 3a and 3b show the transmission curves for the glass of Examples 1, 4, 5, and 6 at different wavelengths.
Figure 3B:
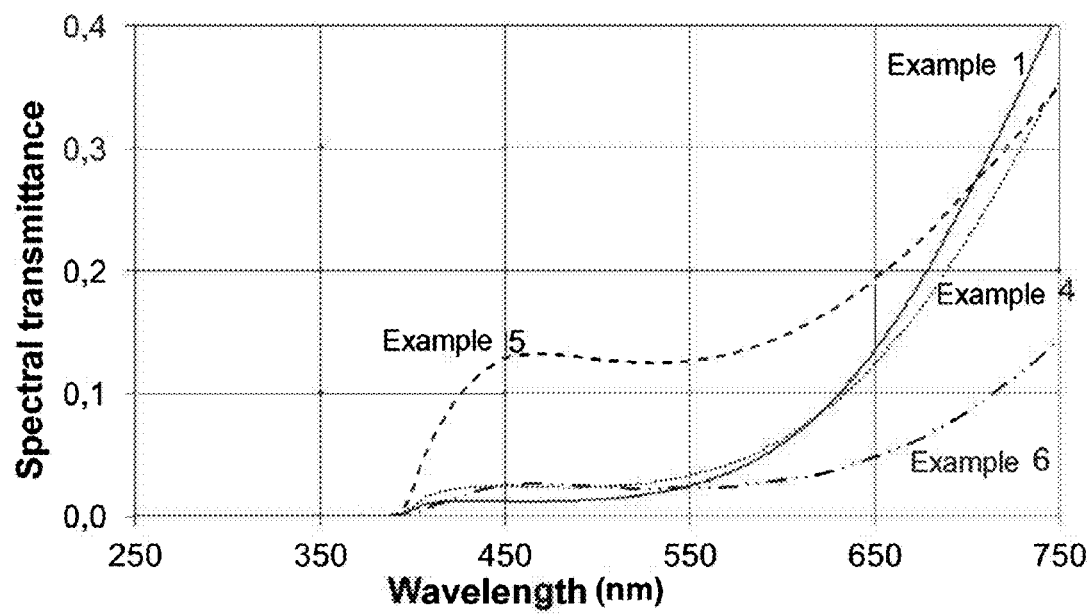
Figure 4:
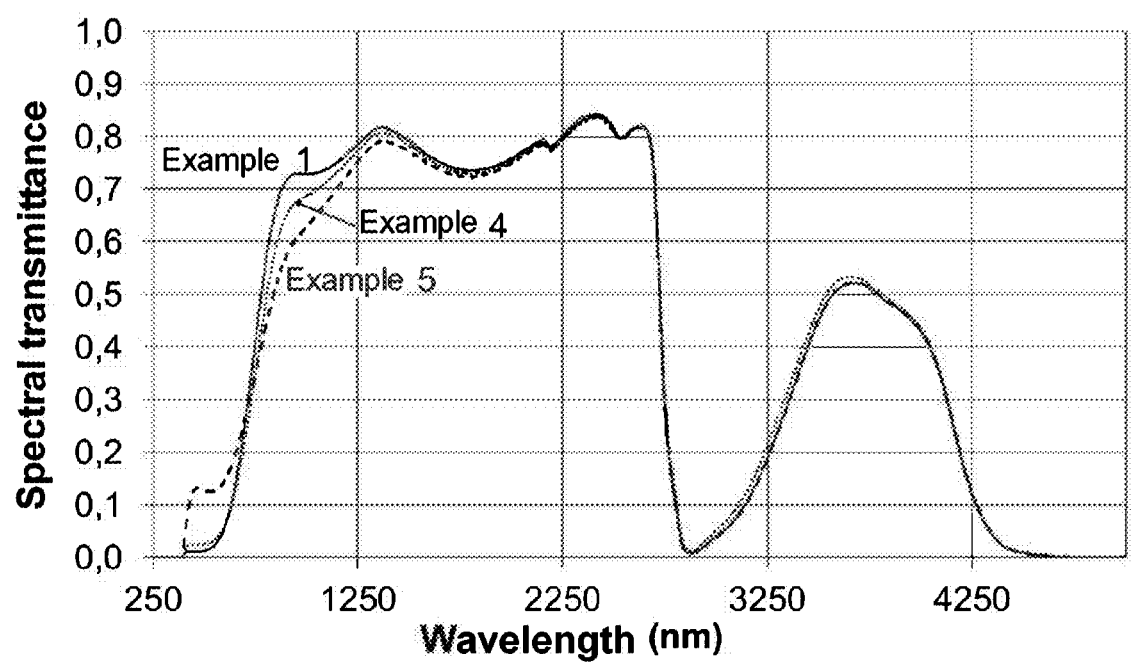
FIG. 4 shows the transmission curves for the glass of Examples 1, 4, and 5.

FIGS. 1a and b show chromaticity diagrams of the CIExyY colour space with 2° standard observer (CIExyY-2°). FIG. 1a depicts the black-body curve as a dotted line, the two white regions W1 and W2 as a dashed line, the colour coordinates of the inventive examples as black squares, and examples from the prior art as black crosses. The examples shown from the prior art correspond to the glass ceramic types known from WO 2012076414 A1 and commercially available glass ceramics from SCHOTT AG and Eurokera. The examples from the prior art are all outside the white region W1. All the colour loci shown relate to a material thickness of 4 mm. FIG. 1b shows an enlarged detail of FIG. 1a.

FIGS. 2, 3a, 3b, 4, 5a, and 5b show the transmission curves for some crystallizable glasses detailed and the glass ceramic examples with thickness 4 mm in various wavelength ranges.

The crystallizable glasses 1 to 35 were melted from technical batch raw materials that are customary in the glass industry at temperatures of 1620° C. for 4 hours. With this choice, the demands for economically viable raw materials and a low impurity content of unwanted impurities can be reconciled. After the melting of the batch in crucibles made of sintered silica glass, the melts were poured into Pt/Rh crucibles with an inner silica glass crucible and homogenized by stirring at temperatures of 1600° C. for 60 minutes. After this homogenization, the glasses were refined at 1640° C. for 2 hours. Subsequently, pieces of size about 120×140×30 $mm^3$ were cast and cooled down to room temperature in a cooling oven beginning from 640° C. in order to dissipate stresses. The castings were divided into the sizes required for the studies and for the ceramization.

The impurities through typical trace elements in the technical raw materials used are 200 ppm $B_2O_3$, 30 ppm Cl, 1 ppm CoO, 3 ppm $Cr_2O_3$, 200 ppm $Cs_2O$, 3 ppm CuO, 200 ppm F, 400 ppm $HfO_2$, 3 ppm NiO, 500 ppm $Rb_2O$, 5 ppm $V_2O_5$.

Table 1 shows a base composition for crystallizable glasses and the properties thereof. The base composition base glass 1 corresponds to the comparative glass 1 according to the prior art, which cannot be used to produce sightglasses of the disclosure. Table 1 also lists the following properties in the vitreous state: transformation temperature Tg [° C.], working temperature VA [° C.], $10^2$ temperature [° C.] and upper devitrification limit UDL [° C.]. For measurement of the UDL, the glasses were fused in Pt/Rh10 crucibles. Subsequently, the crucibles were kept at different temperatures in the region of the working temperature for 5 hours. The uppermost temperature at which the first crystals occur at the contact surface of the glass melt with the crucible wall determines the UDL. The glass properties of the base glass are altered to a minor degree by doping with small amounts of colouring compounds.

Different contents of colouring compounds are added to the batch raw materials of this base composition, and new glasses are fused. By addition of the $MoO_3$ component, compositions of the disclosure are obtained. The glasses thus obtained in Table 2 have the base composition of glass 1 and differ merely in the colouring compounds specified and optionally reducing additives. They are crystallized by the ceramization programs listed in Table 2. The transmission properties and scatter of the glass ceramics obtained are listed. The main crystal phase measured by x-ray diffraction is also listed. For some examples, thermal expansion between 20° C. and 300 or 700° C. was also measured.

Examples 1 and 2 are comparative examples from the prior art (WO 2010102859 A1), with a $V_2O_5$ content of 0.023% by weight, which were ceramized from comparative glass 1 with different programs. Inventive examples 3 and 4 contain less than 0.015% by weight of $V_2O_5$. By comparison with $V_2O_5$-free examples, these shift light of the standard illuminant D65 more strongly in the red direction, namely to x coordinates >0.4. By contrast with Comparative Examples 1 and 2, however, the value is still in the region of x<0.5. Light transmitted through the glass ceramics of Examples 3 and 4 at a thickness of 4 mm is within the white region W1, but is not within the white region W2 owing to the $V_2O_5$ content. Examples 3 and 4 are the only inventive examples that are not also within the particularly preferred white region W2.

The further Comparative Examples 16 and 26 contain more than 0.01% by weight of $Cr_2O_3$. Light of the standard illuminant D65 transmitted through such glass ceramics is no longer within the white region W1.

In the case of crystallizable starting glasses of the same oxide composition, the effect of different ceramizations and the addition of reducing compounds and of shards to the batch on transmission should be noted. In the case of addition of sugar, this is oxidized without measurable residues, but affects the redox state of the glass. In the case of glass 29, 0.07% by weight of S is added to the batch as ZnS. In the glass, the analysed concentration of S is <10 ppm below the detection limit. The addition both of sugar and of S leads to a significant enhancement of colouring by Mo.

Figure 5A:
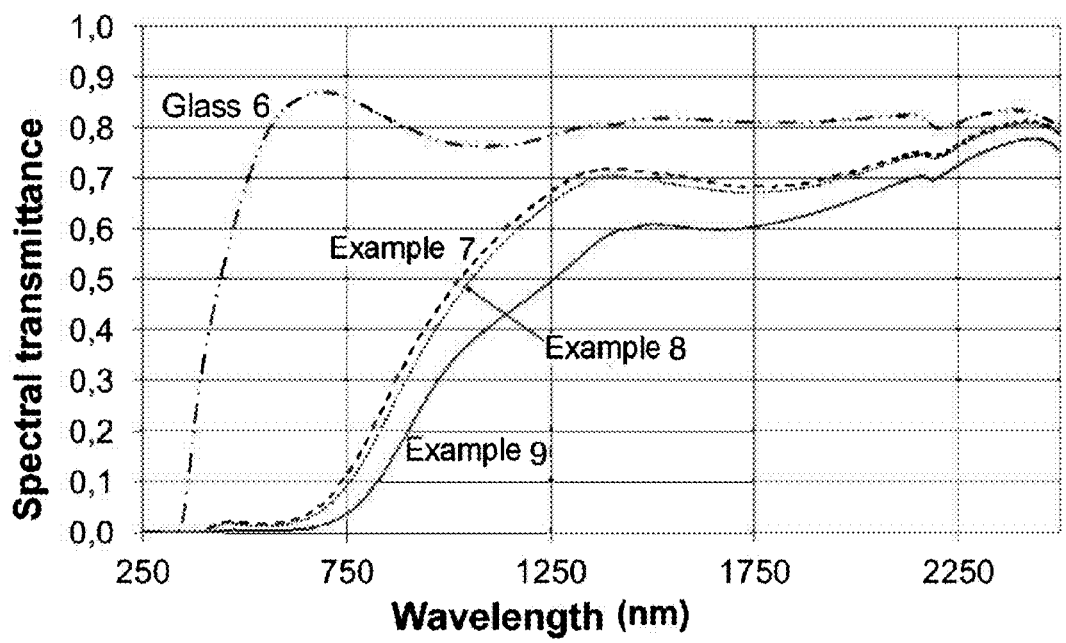
FIGS. 5a and 5b show the transmission curves for the glass of Examples 6, 7, 8, and 9 at different wavelengths.
Figure 5B:
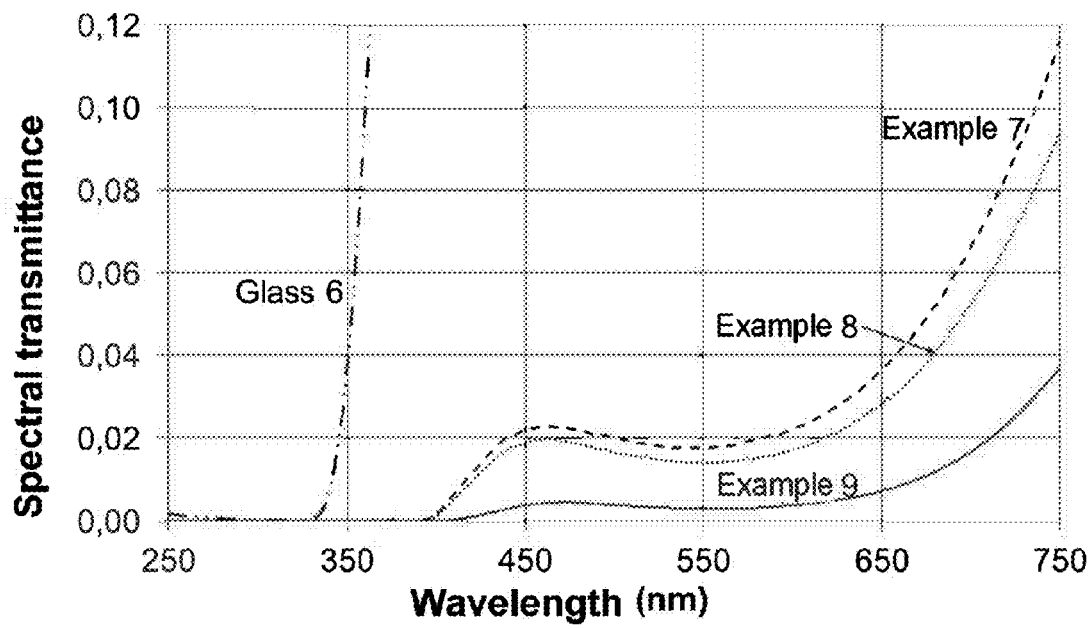

FIGS. 5a and 5b show how different transmission spectra are obtained from the crystallizable glass 6 by different ceramizations. It can also be inferred from FIGS. 5a-5b and FIG. 2 that colouring with Mo sets in only with the ceramization.

In the case of the glass ceramics of Table 2 with high quartz mixed crystals as main crystal phase, thermal expansion is altered to a minor degree by the doping with colouring compounds. For selected examples, thermal expansion was measured between 20 and 300° C. and between 20 and 700° C., and in each case is within a range of less than $\Delta=\pm0.07\cdot10^{-6}$/K around the averages −0.27 and $0.13\cdot10^{-6}$/K. The values for the non-measured examples are also assumed to be within this region.

Table 3 shows the compositions of further crystallizable glasses and selected properties. Comparative glass 22, in terms of its composition, corresponds to the KeraVision® glass ceramic from EuroKera. The glass doped with Fe, V, Mn and Co, after transformation to the comparative glass ceramic 29 (Table 4), does not attain the low colour of the disclosure; more particularly, light transmitted through such a glass ceramic is no longer within the white region W1. Examples 30 and 38 have a higher $TiO_2$ content and show an enhancement of colouring with molybdenum oxide. Examples 31 and 32 produced from the crystallizable glasses 23 and 24 have been refined not with $SnO_2$ but with $As_2O_3$. The described disadvantages of the weaker redox partner As are manifested. Compared to Sn, colouring with $MoO_3$ is much lower, and even the addition of reducing compounds cannot significantly reduce the brightness, unlike in the case of $SnO_2$-refined glass ceramics.

The ceramization program 1 involves heating up to a temperature of 600° C. in the ceramization oven within 20 min. The oven is heated up further. The total time from room temperature to 680° C. is 23 min. The temperature range from 680° C. to 800° C. is important for nucleation. Therefore, the oven is heated up further. The total time between 680° C. and 800° C. is 19 min. Above about 800° C., the desired high quartz mixed crystal phase crystallizes. The total time from 800° C. until attainment of the maximum temperature of 918° C. is 24 min (heating rate 5° C./minute). At the maximum temperature of 918° C., hold time 10 min, the composition of crystals and residual glass is established and the microstructure is homogenized. This establishes the chemical and physical properties of the glass ceramic. Cooling is effected in a controlled manner to 800° C. (cooling rate 6° C./min), then the sample is quenched to room temperature by opening the oven door; in other words, in summary:

Ceramization program 1 (ceramization time 96 min): heating within 23 minutes from room temperature to 680° C.; temperature increase from 680 to 800° C. within 19 min, involving heating at 10° C./min to 730° C., further heating at 5° C./min to 800° C.; temperature increase from 800° C. to 918° C. within 24 min and hold time of 10 min at maximum temperature; cooling down to 800° C. within 20 minutes, then rapid cooling to room temperature.

In ceramization program 2, the ceramization time has been shortened. Ceramization program 2 (ceramization time 68 min): rapid heating from room temperature to 740° C. within 26 min, b) temperature increase from 740 to 825° C. within 18 min (heating rate 4.7° C./min), temperature increase from 825° C. to 930° C. within 4 min (heating rate 26° C./min), hold time of 4 min at maximum temperature, cooling down to 800° C. within 16 minutes, then rapid cooling to room temperature.

An additional ceramization program 3 effected transformation to glass ceramics with keatite mixed crystals as main crystal phase. In this program, the procedure of program 1 was followed up to 800° C. Then, in a departure from program 1, heating was effected at a heating rate of 5° C./min to a maximum temperature of 960° C. with hold time 10 min. Cooling was effected from the maximum temperature at 6° C./min to 800° C., and then cooling was effected rapidly to room temperature.

The glass ceramics of Examples 9 and 11 that were produced by the ceramization program 3 contain, measured by x-ray diffraction, 79% keatite mixed crystals as main crystal phase. At the same time, crystallite sizes are enlarged at about 120 nm, and so disruptive scatter occurs when display elements are used below the glass ceramic. The other glass ceramics produced with the ceramization programs 1 and 2 contain high quartz mixed crystals at generally more than 90% of the total crystal phase content. Further crystal phases are the nucleator phases $ZrTiO_4$. At the same time, crystallite sizes are so small at less than 70 nm that no disruptive scatter occurs when display elements are used below the glass ceramic.

The thermal expansion of the glass ceramics with high quartz mixed crystal as main crystal phase is $0\pm0.5\cdot10^{-6}$/K in the range of 20-700° C., i.e. meets the demands for thermally stable glass ceramics. For example, thermal expansion for the base composition of example 1 is $0.13\cdot10^{-6}$/K, and for Example 36 is $0.34\cdot10^{-6}$/K, in the range of 20-700° C. For Example 11, the CTE is $0.7\times10^{-6}$/K in the range of 20-700° C.

The transmission measurements were conducted on polished plates with the Perkin-Elmer Lambda 900 instrument. Transmission was determined on samples having a thickness of 3.5 to 4.1 mm and converted to a thickness of 4 mm. Spectral transmittances are reported for selected wavelengths. The measured spectral values in the range between 380 nm and 780 nm, which represents visible light, are used to calculate the brightness L* and the colour coordinates a*, b* in the CIELAB colour system, and the brightness Y and colour coordinates x, y to DIN 5033 in the CIE colour system for the chosen standard illuminant and observer angle 2°. Chromaticity c* and the colour separation d from the colour coordinates of light of the standard illuminant D65, x=0.3127 and y=0.3290, are reported. This was calculated as follows:

$$d=\sqrt{(x-0.3127)^2+(y-0.3290)^2}.$$

For some samples, the colour coordinates in the CIELAB colour system were measured in reflectance. For this purpose, the Konica Minolta CM-700d spectrophotometer, using D65 standard illuminant, a 10° standard observer, was used to measure the colour locus in reflectance. The black trap used was the CM-A511 black glass tile from Konica Minolta. In this context, the expression "measurement against a black trap" means that the sample to be measured is disposed between the measuring instrument and a black trap. The values are reported for 4 mm-thick polished samples. The colour coordinates of the samples correspond to a colour-neutral black hue.

The profile of the transmission curve in the range from 470 to 630 nm was used to calculate the flatness of the curve (quotient of highest to lowest transmission in this range).

The wavelengths for the maximum and minimum transmission are likewise reported. The values are reported for 4 mm-thick polished samples.

The scatter of the glass ceramics is determined by measuring haze. This involves measuring samples of thickness 3.5-4.1 mm that have been polished on both sides with a commercial "Haze-gard plus" measuring instrument from BYK Gardner (standard ASTM D1003-13) with standard light C. Scatter is characterized by the haze value in the tables.

In addition, a visual assessment is conducted on the samples with a commercial white LED of the 7-segment display type (manufacturer: opto devices, model: OS39D3BWWA). The polished glass ceramic samples were placed onto the white LED at a distance of 1 mm and viewed from above at a distance of 31 cm over the entire angle range, i.e. perpendicularly to obliquely to the glass ceramic surface. Depending on the brightness of the glass ceramic sample, the luminance of the white LED at this distance at right angles to the glass ceramic plate was regulated to 60 cd/m$^2$, or, in the case of very dark glass ceramic samples Y<0.5%, operated at maximum power. In order to rule out the influence of outside light, the assessment is undertaken in a dark chamber with low ambient lighting of about 4 lux.

The visual assessments in the tables mean: 1=no scatter perceptible, 2=low but tolerable scatter, 3=visible scatter, requires additional work for the configuration of the cooktop, 4=distinctly visible scatter, intolerable. Ratings over and above stage 4 are impermissible, and those over and above stage 3 should preferably be avoided. Apart from the Examples 9 and 11 with keatite mixed crystal (KMC) as main crystal phase, the examples have no visible scatter.

Apart from those cited as comparative examples, all the glass ceramics adduced by way of example are suitable for use in the sightglasses of the disclosure. They especially fulfil all the demands for use in stoves, baking ovens and barbecues.

TABLE 1

COMPOSITION AND PROPERTIES OF THE CRYSTALLIZABLE BASE GLASS 1 WITH BASE COMPOSITION.

|  | % by wt. | Glass No. 1 |
|---|---|---|
| Composition |  |  |
| Li$_2$O |  | 3.80 |
| Na$_2$O |  | 0.60 |
| K$_2$O |  | 0.25 |
| MgO |  | 0.29 |
| CaO |  | 0.40 |
| SrO |  | 0.02 |
| BaO |  | 2.23 |
| ZnO |  | 1.53 |
| Al$_2$O$_3$ |  | 20.9 |
| SiO$_2$ |  | 65.0 |
| TiO$_2$ |  | 3.10 |
| ZrO$_2$ |  | 1.38 |
| P$_2$O$_5$ |  | 0.09 |
| SnO$_2$ |  | 0.25 |
| As$_2$O$_3$ |  |  |
| Fe$_2$O$_3$ |  | 0.090 |
| V$_2$O$_5$ |  | 0.023 |
| MoO$_3$ |  |  |
| MnO$_2$ |  | 0.025 |
| Cr$_2$O$_3$ |  |  |
| CeO$_2$ |  |  |
| WO$_3$ |  |  |
| H$_2$O content (β-OH) | mm$^{-1}$ | 0.39 |
| Properties in glass form |  |  |
| Transformation temperature Tg | ° C. | 662 |
| 10$^2$ temperature | ° C. | 1742 |
| Working temperature V$_A$ | ° C. | 1306 |
| UDL temperature | ° C. | 1260 |

TABLE 2

DOPANTS AND PROPERTIES OF THE GLASS CERAMICS SUITABLE FOR SIGHTGLASSES OF THE DISCLOSURE AND COMPARATIVE GLASS CERAMICS 1 AND 2

|  |  | Example No. | | | | | |
|---|---|---|---|---|---|---|---|
|  |  | 1 | 2 | 3 | 4 | 5 | 6 |
| Glass No. |  | 1 | 1 | 2 | 3 | 4 | 5 |
| Base glass |  | 1 | 1 | 1 | 1 | 1 | 1 |
|  |  | Dopants (% by wt.) | | | | | |
| Fe$_2$O$_3$ |  | 0.090 | 0.090 | 0.120 | 0.088 | 0.088 | 0.088 |
| V$_2$O$_5$ |  | 0.023 | 0.023 | 0.010 | 0.013 |  |  |
| MoO$_3$ |  |  |  | 0.057 | 0.046 | 0.078 | 0.170 |
| MnO$_2$ |  | 0.025 | 0.025 | 0.025 | 0.025 | 0.025 | 0.025 |
| Cr$_2$O$_3$ |  |  |  |  |  |  |  |
| CeO$_2$ |  |  |  |  |  |  |  |
| WO$_3$ |  |  |  |  |  |  |  |
| Addition to batch |  |  |  |  |  |  |  |
| Ceramization program | # | 1 | 2 | 1 | 1 | 1 | 1 |
|  |  | Properties in ceramized form | | | | | |
|  |  | Transmission, thickness 4 mm | | | | | |
| 470 nm | % | 1.2 | 0.7 | 2.9 | 2.4 | 13.3 | 2.7 |
| 630 nm | % | 9.9 | 6.6 | 12.6 | 9.5 | 17.2 | 3.9 |
| 950 nm | % | 73.0 | 71.9 | 66.5 | 67.7 | 60.8 | 45.0 |
| 1600 nm | % | 76.4 | 76.3 | 70.9 | 75.7 | 74.8 | 70.3 |
| 3700 nm | % | 52.0 | 51.1 | 50.0 | 53.2 | 52.2 | 50.4 |

TABLE 2-continued

| Colour coordinates (CIE) in transmission, thickness 4 mm, D65 | | | | | | | |
|---|---|---|---|---|---|---|---|
| x | | 0.502 | 0.517 | 0.447 | 0.436 | 0.337 | 0.348 |
| y | | 0.367 | 0.358 | 0.365 | 0.351 | 0.334 | 0.327 |
| Brightness Y | % | 3.6 | 2.2 | 5.8 | 4.4 | 13.6 | 2.6 |
| Colour distance d | | 0.193 | 0.207 | 0.139 | 0.125 | 0.025 | 0.035 |
| Colour coordinates (CIELAB) in reflectance | | | | | | | |
| L* | | 25.19 | 24.99 | 25.74 | | 26.52 | |
| a* | | 0.28 | 0.04 | 0.39 | | 0.16 | |
| b* | | −0.66 | −0.78 | 0.80 | | −0.80 | |
| c* | | 0.72 | 0.78 | 0.89 | | 0.82 | |
| Flatness of transmission (wavelength at max./min.) | nm | 8.4 630/470 | 10.0 630/470 | 4.4 630/470 | 4.0 630/470 | 1.4 630/529 | 1.7 630/538 |
| Visual assessment | | 1 | 1 | 1 | 1 | 1 | 1 |
| Haze | % | 0.8 | 0.5 | 1.5 | 1.5 | 1.5 | 1.1 |
| Thermal expansion ($10^{-6}$/K) | | | | | | | |
| $\alpha_{20/300}$ | | −0.26 | −0.29 | | | | |
| $\alpha_{20/700}$ | | 0.13 | 0.17 | | | | |
| X-ray diffraction | | | | | | | |
| Main crystal phase | | HQMC | HQMC | HQMC | HQMC | HQMC | HQMC |

DOPANTS AND PROPERTIES OF THE GLASS CERAMICS

| | Example No. | |
|---|---|---|
| | 7 | 8 |
| Glass No. | 6 | 6 |
| Base glass | 1 | 1 |
| Dopants (% by wt.) | | |
| $Fe_2O_3$ | 0.088 | 0.088 |
| $V_2O_5$ | | |
| $MoO_3$ | 0.170 | 0.170 |
| $MnO_2$ | 0.025 | 0.025 |
| $Cr_2O_3$ | | |
| $CeO_2$ | | |
| $WO_3$ | | |
| Addition to batch | 50% shards | 50% shards |
| Ceramization program | 1 | 2 |
| Properties in ceramized form | | |
| Transmission, thickness 4 mm | | |
| 470 nm | 2.3 | 2.0 |
| 630 nm | 3.9 | 2.3 |
| 950 nm | 41.5 | 35.3 |
| 1600 nm | 69.8 | 68.5 |
| 3700 nm | 51.8 | 52.0 |
| Colour coordinates (CIE) in transmission, thickness 4 mm, D65 | | |
| x | 0.338 | 0.329 |
| y | 0.318 | 0.311 |
| Brightness Y | 2.0 | 1.6 |
| Colour distance d | 0.028 | 0.024 |
| Colour coordinates (CIELAB) in transmission | | |
| L* | 15.7 | 13.4 |
| a* | 5.2 | 4.5 |
| b* | 0.1 | −1.1 |
| c* | 5.2 | 4.7 |
| Flatness of transmission (wavelength at max./min.) | 2.2 630/545 | 1.6 630/552 |
| Scatter at thickness 4 mm | | |
| Visual assessment | 1 | 1 |
| Haze | 0.4 | 2.3 |
| Thermal expansion | | |
| $\alpha_{20/300}$ | | |
| $\alpha_{20/700}$ | | |

TABLE 2-continued

| | | X-ray diffraction | | | | |
|---|---|---|---|---|---|---|
| Main crystal phase | | HQMC | | | HQMC | |

| | | Example No. | | | | | |
|---|---|---|---|---|---|---|---|
| | | 9 | 10 | 11 | 12 | 13 | 14 |
| Glass No. | | 6 | 7 | 8 | 9 | 10 | 11 |
| Base glass | | 1 | 1 | 1 | 1 | 1 | 1 |
| | | Dopants (% by wt.) | | | | | |
| $Fe_2O_3$ | | 0.088 | 0.017 | 0.086 | 0.090 | 0.084 | 0.062 |
| $V_2O_5$ | | | | | | | |
| $MoO_3$ | | 0.170 | 0.170 | 0.013 | 0.057 | 0.150 | 0.150 |
| $MnO_2$ | | 0.025 | | 0.025 | 0.025 | 0.025 | 0.025 |
| $Cr_2O_3$ | | | | | | | |
| $CeO_2$ | | | | | | | |
| $WO_3$ | | | | | | | |
| Addition to batch | | 50% shards | | | | 0.1% sugar without nitrate | |
| Ceramization program | # | 3 | 1 | 3 | 1 | 1 | 1 |
| | | Properties in ceramized form Transmission, thickness 4 mm | | | | | |
| 470 nm | % | 0.4 | 0.8 | 33.5 | 16.7 | 0.12 | 1.2 |
| 630 nm | % | 0.5 | 0.6 | 43.7 | 21.7 | 0.07 | 1.9 |
| 950 nm | % | 27.0 | 28.9 | 73.0 | 62.1 | 11.2 | 36.7 |
| 1600 nm | % | 60.1 | 75.3 | 76.3 | 75.1 | 56.9 | 71.5 |
| 3700 nm | % | 56.2 | 48.5 | 56.1 | 51.0 | 48.7 | 52.4 |
| | | Colour coordinates (CIE) in transmission, thickness 4 mm, D65 | | | | | |
| x | | 0.341 | 0.290 | 0.3401 | 0.337 | 0.271 | 0.323 |
| y | | 0.322 | 0.275 | 0.3553 | 0.339 | 0.264 | 0.305 |
| Brightness Y | % | 0.3 | 0.5 | 38.2 | 17.6 | 0.1 | 1.4 |
| Colour distance d | | 0.029 | 0.059 | 0.038 | 0.026 | 0.077 | 0.026 |
| | | Colour coordinates (CIELAB) in reflectance | | | | | |
| L* | | | | | 25.66 | | |
| a* | | | | | 0.15 | | |
| b* | | | | | −0.9 | | |
| c* | | | | | 0.91 | | |
| Flatness of transmission (wavelength at max./min.) | nm | 1.8 630/ 552 | 1.9 630/ 567 | 1.3 630/ 470 | 1.3 630/ 524 | 2.4 470/ 580 | 1.6 630/ 553 |
| | | Scatter at thickness 4 mm | | | | | |
| Visual assessment | | 3 | 1 | 3 | 1 | 1 | 1 |
| Haze | % | 9.2 | 0.8 | 10.7 | 1.3 | 2.6 | 0.5 |
| | | Thermal expansion | | | | | |
| $\alpha_{20/300}$ | $10^{-6}$/K | 0.56 | | | −0.24 | | |
| $\alpha_{20/700}$ | $10^{-6}$/K | | | 0.70 | 0.16 | | |
| | | X-ray diffraction | | | | | |
| Main crystal phase | | KMC | HQMC | KMC | HQMC | HQMC | HQMC |

DOPANTS AND PROPERTIES OF THE GLASS CERAMICS AND COMPARATIVE GLASS CERAMIC 16.

| | Example No. | | | | | | |
|---|---|---|---|---|---|---|---|
| | 15 | 16 | 17 | 18 | 19 | 20 | 21 |
| Glass No. | 11 | 12 | 13 | 13 | 14 | 15 | 15 |
| Base glass | 1 | 1 | 1 | 1 | 1 | 1 | 1 |
| | Dopants (% by wt.) | | | | | | |
| $Fe_2O_3$ | 0.062 | 0.080 | 0.062 | 0.062 | 0.061 | 0.062 | 0.062 |
| $V_2O_5$ | | 0.010 | | | | | |
| $MoO_3$ | 0.150 | 0.150 | 0.150 | 0.150 | 0.150 | 0.040 | 0.040 |
| $MnO_2$ | 0.025 | 0.025 | 0.023 | 0.023 | 0.023 | 0.025 | 0.025 |
| $Cr_2O_3$ | | 0.0036 | | | | | |
| $CeO_2$ | | | 0.060 | 0.060 | | | |
| $WO_3$ | | | | | 0.050 | | |

TABLE 2-continued

| | | | | | | | 0.2% sugar without nitrate | 0.2% sugar without nitrate |
|---|---|---|---|---|---|---|---|---|
| Addition to batch | | | | | | | | |
| Ceramization program | # | 2 | 1 | 1 | 2 | 1 | 1 | 2 |
| Properties in ceramized form Transmission, thickness 4 mm | | | | | | | | |
| 470 nm | % | 1.5 | 0.3 | 2.6 | 2.3 | 2.4 | 4.8 | 4.2 |
| 630 nm | % | 1.6 | 1.5 | 3.4 | 2.8 | 2.9 | 2.8 | 2.2 |
| 950 nm | % | 34.2 | 49.3 | 44.5 | 41.8 | 41.6 | 32.1 | 28.9 |
| 1600 nm | % | 70.9 | 70.9 | 73.7 | 73.1 | 73.3 | 75.7 | 74.7 |
| 3700 nm | % | 52.4 | 50.5 | 52.0 | 51.8 | 51.9 | 50.6 | 50.5 |
| Colour coordinates (CIE) in transmission, thickness 4 mm, D65 | | | | | | | | |
| x | | 0.315 | 0.490 | 0.341 | 0.331 | 0.329 | 0.268 | 0.260 |
| y | | 0.299 | 0.367 | 0.324 | 0.316 | 0.311 | 0.276 | 0.266 |
| Brightness Y | % | 1.2 | 0.6 | 2.4 | 2.0 | 2.1 | 3.0 | 2.5 |
| Colour distance d | | 0.030 | 0.181 | 0.028 | 0.023 | 0.024 | 0.069 | 0.082 |
| Colour coordinates (CIELAB) in transmission | | | | | | | | |
| L* | | 10.3 | 5.4 | 17.4 | 15.3 | 15.9 | 20.2 | 18.1 |
| a* | | 3.9 | 9.3 | 5.0 | 4.5 | 4.9 | 1.2 | 1.2 |
| b* | | −2.6 | 5.9 | 0.9 | −0.5 | −1.1 | −9.3 | −10.4 |
| c* | | 4.7 | 11.0 | 5.1 | 4.5 | 5.1 | 9.4 | 10.5 |
| Flatness of transmission (wavelength at max./min.) | nm | 1.5 630/558 | 5.7 630/470 | 1.6 630/542 | 1.6 630/549 | 1.6 630/545 | 1.8 470/594 | 2.0 470/601 |
| Scatter at thickness 4 mm | | | | | | | | |
| Visual assessment | | 1 | 1 | 1 | 1 | 1 | 1 | 1 |
| Haze | % | 3.1 | 0.8 | 0.5 | 1.0 | 1.0 | 0.8 | 2.1 |
| Thermal expansion ($10^{-6}$/K) | | | | | | | | |
| $\alpha_{20/300}$ | | −0.23 | −0.21 | −0.27 | −0.25 | −0.27 | −0.27 | −0.32 |
| $\alpha_{20/700}$ | | 0.17 | 0.17 | 0.11 | 0.15 | 0.14 | 0.09 | |
| X-ray diffraction | | | | | | | | |
| Main crystal phase | | HQMC | HQMC | HQMC | HQMC | HQMC | HQMC | HQMC |

DOPANTS AND PROPERTIES OF INVENTIVE GLASS CERAMICS AND COMPARATIVE GLASS CERAMIC 26.

| | Example No. | | | | | | |
|---|---|---|---|---|---|---|---|
| | 22 | 23 | 24 | 25 | 26 | 27 | 28 |
| Glass No. | 16 | 16 | 17 | 18 | 19 | 20 | 21 |
| Base glass | 1 | 1 | 1 | 1 | 1 | 1 | 1 |
| Dopants (% by wt.) | | | | | | | |
| $Fe_2O_3$ | 0.062 | 0.062 | 0.061 | 0.062 | 0.062 | 0.062 | 0.061 |
| $V_2O_5$ | | | | | | | |
| $MoO_3$ | 0.015 | 0.015 | 0.019 | 0.014 | 0.150 | 0.150 | 0.150 |
| $MnO_2$ | 0.025 | 0.025 | 0.025 | 0.025 | 0.025 | 0.025 | 0.025 |
| CoO | | | | | | | 0.020 |
| $Cr_2O_3$ | | | | | 0.020 | | |
| $Nd_2O_3$ | | | | 0.042 | | | |
| NiO | | | | | | 0.027 | |
| Addition to batch | | | 0.1% sugar without nitrate | | | | |
| Ceramization program | # | 1 | 2 | 1 | 1 | 1 | 1 | 1 |
| Properties in ceramized form Transmission, thickness 4 mm | | | | | | | |
| 470 nm | % | 42.6 | 43.4 | 22.2 | 42.8 | 0.3 | 1.6 | 2.0 |
| 630 nm | % | 53.4 | 52.7 | 21.2 | 54.2 | 2.6 | 2.1 | 2.0 |
| 950 nm | % | 76.4 | 75.9 | 57.4 | 76.5 | 43.5 | 36.6 | 39.7 |
| 1600 nm | % | 80.8 | 80.4 | 78.1 | 80.8 | 73.1 | 63.8 | 66.7 |
| 3700 nm | % | 53.6 | 53.4 | 50.5 | 53.2 | 51.9 | 50.8 | 50.4 |

TABLE 2-continued

| Colour coordinates (CIE) in transmission, thickness 4 mm, D65 | | | | | | | | |
|---|---|---|---|---|---|---|---|---|
| x | | 0.335 | 0.332 | 0.311 | 0.334 | 0.475 | 0.341 | 0.315 |
| y | | 0.348 | 0.345 | 0.326 | 0.348 | 0.452 | 0.309 | 0.257 |
| Brightness Y | % | 47.6 | 47.4 | 20.4 | 47.8 | 1.5 | 1.3 | 1.2 |
| Colour distance d | | 0.029 | 0.025 | 0.003 | 0.029 | 0.204 | 0.035 | 0.072 |
| Colour coordinates (CIELAB) in reflectance | | | | | | | | |
| L* | | 28.13 | 28.42 | 25.84 | | | | |
| a* | | 0.32 | 0.30 | −0.05 | | | | |
| b* | | 0.15 | 0.31 | −1.27 | | | | |
| c* | | 0.35 | 0.43 | 1.27 | | | | |
| Flatness of transmission (wavelength at max./min.) | nm | 1.3 630/470 | 1.2 630/470 | 1.1 470/572 | 1.3 630/470 | 7.8 630/470 | 2.0 630/538 | 2.4 630/546 |
| Scatter at thickness 4 mm | | | | | | | | |
| Visual assessment | | 1 | 1 | 1 | 1 | 1 | 1 | 1 |
| Haze | % | 1.9 | 1.6 | 2.7 | | 0.6 | 0.6 | 0.7 |
| Thermal expansion | | | | | | | | |
| $\alpha_{20/300}$ | $10^{-6}$/K | −0.24 | −0.28 | −0.24 | −0.21 | | −0.23 | −0.23 |
| $\alpha_{20/700}$ | $10^{-6}$/K | 0.16 | 0.09 | 0.14 | 0.16 | | 0.17 | 0.15 |
| X-ray diffraction | | | | | | | | |
| Main crystal phase | | HQMC | HQMC | HQMC | HQMC | HQMC | HQMC | HQMC |

TABLE 3

COMPOSITIONS AND PROPERTIES OF CRYSTALLIZABLE GLASSES AND COMPARATIVE GLASS NO. 22

| | | Glass No. | | | | |
|---|---|---|---|---|---|---|
| | % by wt. | 22 | 23 | 24 | 25 | 26 |
| Composition | | | | | | |
| $Li_2O$ | | 3.83 | 3.82 | 3.83 | 3.79 | 3.71 |
| $Na_2O$ | | 0.57 | 0.60 | 0.61 | 0.60 | 0.46 |
| $K_2O$ | | 0.21 | 0.27 | 0.27 | 0.26 | 0.14 |
| MgO | | 0.19 | 0.30 | 0.30 | 0.29 | 0.98 |
| CaO | | 0.36 | 0.43 | 0.43 | 0.43 | |
| SrO | | | 0.02 | 0.02 | 0.02 | |
| BaO | | 2.41 | 2.22 | 2.21 | 2.23 | |
| ZnO | | 1.41 | 1.52 | 1.49 | 1.47 | 1.58 |
| $Al_2O_3$ | | 20.2 | 20.9 | 20.9 | 21.0 | 20.9 |
| $SiO_2$ | | 65.8 | 64.8 | 64.8 | 65.0 | 67.5 |
| $TiO_2$ | | 3.02 | 4.10 | 3.14 | 3.05 | 2.47 |
| $ZrO_2$ | | 1.39 | 0.43 | 1.40 | 1.40 | 1.69 |
| $P_2O_5$ | | 0.11 | 0.10 | 0.10 | 0.10 | 0.09 |
| $SnO_2$ | | 0.30 | 0.25 | | | 0.23 |
| $As_2O_3$ | | | | 0.28 | 0.15 | |
| $Fe_2O_3$ | | 0.090 | 0.061 | 0.062 | 0.061 | 0.0600 |
| $V_2O_5$ | | 0.016 | | | | |
| $MoO_3$ | | | 0.150 | 0.150 | 0.150 | 0.1500 |
| $MnO_2$ | | 0.021 | 0.024 | 0.025 | 0.025 | 0.024 |
| CoO | | 0.027 | | | | |
| Addition to batch | (% by wt.) | | | | 0.2% sugar without nitrate | |
| Properties in glass form | | | | | | |
| Transformation temperature $T_g$ | °C. | | 667 | 671 | 672 | 674 |
| $10^2$ temperature | °C. | | | | | 1729 |
| Working temperature $V_A$ | °C. | 1313 | 1294 | 1297 | 1301 | 1310 |
| UDL temperature | °C. | | | | | 1280 |

TABLE 3-continued

COMPOSITIONS AND PROPERTIES OF CRYSTALLIZABLE GLASSES

| | % by wt. | Glass No. 27 | 28 | 29 | 30 |
|---|---|---|---|---|---|
| Composition | | | | | |
| $Li_2O$ | | 4.03 | 3.82 | 3.31 | 3.30 |
| $Na_2O$ | | 0.42 | 0.60 | 0.37 | 0.36 |
| $K_2O$ | | 0.40 | 0.26 | 0.36 | 0.36 |
| MgO | | 0.77 | 0.30 | 0.56 | 0.56 |
| CaO | | | 0.43 | 0.58 | 0.58 |
| SrO | | | 0.02 | | 0.01 |
| BaO | | 0.39 | 2.23 | 1.62 | 1.63 |
| ZnO | | 0.56 | 1.48 | 1.92 | 1.90 |
| $Al_2O_3$ | | 20.1 | 21 | 21.4 | 21.4 |
| $SiO_2$ | | 68.0 | 64.5 | 64.8 | 64.7 |
| $TiO_2$ | | 4.69 | 3.08 | 3.20 | 4.02 |
| $ZrO_2$ | | | 1.40 | 1.35 | 0.68 |
| $P_2O_5$ | | 0.11 | 0.56 | 0.04 | 0.03 |
| $SnO_2$ | | 0.24 | 0.23 | 0.24 | 0.22 |
| $As_2O_3$ | | | | | |
| $Fe_2O_3$ | | 0.062 | 0.062 | 0.099 | 0.100 |
| $V_2O_5$ | | | | | |
| $MoO_3$ | | 0.140 | 0.040 | 0.160 | 0.149 |
| $MnO_2$ | | | 0.025 | | |
| $Nd_2O_3$ | | | | | |
| Addition to batch | (% by wt.) | | 0.07% S | | |
| Properties in glass form | | | | | |
| Transformation temperature $T_g$ | °C. | 670 | 668 | 675 | 670 |
| $10^2$ temperature | °C. | | | 1733 | |
| Working temperature $V_A$ | °C. | 1319 | 1299 | 1300 | 1295 |
| UDL temperature | °C. | | | 1275 | |

| | % by wt. | Glass No. 31 | 32 | 33 | 34 | 35 |
|---|---|---|---|---|---|---|
| Composition | | | | | | |
| $Li_2O$ | | 2.67 | 4.13 | 3.22 | 3.67 | 3.73 |
| $Na_2O$ | | 0.54 | 0.64 | 0.78 | 0.77 | 0.78 |
| $K_2O$ | | 0.24 | 0.29 | 0.20 | 0.21 | 0.58 |
| MgO | | 1.73 | 0.24 | 0.81 | 0.77 | 0.20 |
| CaO | | 0.69 | 0.52 | 0.21 | 0.21 | 0.21 |
| SrO | | | 0.02 | | | |
| BaO | | 1.97 | 2.05 | 2.42 | 0.68 | 2.41 |
| ZnO | | 1.65 | | 1.16 | 0.90 | 0.93 |
| $Al_2O_3$ | | 20.0 | 21.7 | 19.8 | 22.2 | 20.0 |
| $SiO_2$ | | 64.9 | 65.8 | 66.9 | 65.4 | 66.4 |
| $TiO_2$ | | 5.04 | 3.58 | 2.68 | 4.26 | 2.83 |
| $ZrO_2$ | | | 0.64 | 1.44 | 0.54 | 1.40 |
| $P_2O_5$ | | 0.07 | 0.03 | | | |
| $SnO_2$ | | 0.24 | 0.25 | 0.20 | 0.19 | 0.39 |
| $As_2O_3$ | | | | | | |
| $Fe_2O_3$ | | 0.091 | 0.065 | 0.110 | 0.085 | 0.033 |
| $V_2O_5$ | | | | | | |
| $MoO_3$ | | 0.099 | 0.026 | 0.043 | 0.079 | 0.045 |
| $MnO_2$ | | 0.018 | | | | |
| Addition to batch | (% by wt.) | | | | 0.1% sugar without nitrate | 0.2% sugar without nitrate |
| Properties in glass form | | | | | | |
| Transformation temperature $T_g$ | °C. | 671 | 685 | 680 | 675 | 674 |
| $10^2$ temperature | °C. | | 1774 | 1770 | 1693 | 1770 |
| Working temperature $V_A$ | °C. | 1296 | 1327 | 1331 | 1294 | 1331 |
| UDL temperature | °C. | 1265 | 1255 | 1260 | | |

TABLE 4

PROPERTIES FOR THE SIGHTGLASSES OF SUITABLE GLASS CERAMICS AND COMPARATIVE GLASS CERAMIC OF EXAMPLE 29

| | | Example No. | | | | | |
|---|---|---|---|---|---|---|---|
| | | 29 | 30 | 31 | 32 | 33 | 34 |
| Glass No. | | 22 | 23 | 24 | 25 | 26 | 27 |
| Ceramization program | | 2 | 1 | 1 | 1 | 2 | 1 |

Properties in ceramized form
Transmission, thickness 4 mm

| | | 29 | 30 | 31 | 32 | 33 | 34 |
|---|---|---|---|---|---|---|---|
| 470 nm | % | 1.9 | 0.9 | 43.4 | 39.4 | 2.5 | 0.8 |
| 630 nm | % | 10.8 | 0.6 | 57.1 | 52.3 | 7.8 | 1.7 |
| 950 nm | % | 72.0 | 25.6 | 82.2 | 83.1 | 55.4 | 37.6 |
| 1600 nm | % | 67.5 | 73.5 | 82.9 | 82.8 | 70.8 | 73.5 |
| 3700 nm | % | 49.4 | 51.5 | 53.6 | 52.0 | 49.9 | 52.4 |

Colour coordinates (CIE) in transmission, thickness 4 mm, D65

| | | 29 | 30 | 31 | 32 | 33 | 34 |
|---|---|---|---|---|---|---|---|
| x | | 0.476 | 0.276 | 0.342 | 0.342 | 0.414 | 0.393 |
| y | | 0.322 | 0.265 | 0.355 | 0.351 | 0.359 | 0.350 |
| Brightness Y | % | 3.5 | 0.5 | 48.7 | 43.7 | 4.2 | 1.0 |
| Colour distance d | | 0.163 | 0.089 | 0.024 | 0.037 | 0.106 | 0.083 |

Colour coordinates (CIELAB) in reflectance

| | | 29 | 30 | 31 | 32 | 33 | 34 |
|---|---|---|---|---|---|---|---|
| L* | | | | 29.38 | | | |
| a* | | | | 0.46 | | | |
| b* | | | | 0.78 | | | |
| c* | | | | 0.91 | | | |
| Flatness of transmission (wavelength at max./min.) | nm | 8.0 630/504 | 2.1 470/571 | 1.3 630/470 | 1.3 630/470 | 3.1 630/470 | 2.3 630/509 |

Scatter at thickness 4 mm

| | | 29 | 30 | 31 | 32 | 33 | 34 |
|---|---|---|---|---|---|---|---|
| Visual assessment | | 1 | 1 | 1 | 1 | 1 | 1 |
| Haze | % | 0.2 | 3.3 | 2.0 | 1.4 | 0.8 | 0.1 |

Thermal expansion ($10^{-6}$/K)

| | 29 | 30 | 31 | 32 | 33 | 34 |
|---|---|---|---|---|---|---|
| $\alpha_{20/300}$ | −0.40 | −0.13 | −0.24 | −0.27 | −0.45 | −0.14 |
| $\alpha_{20/700}$ | −0.03 | 0.23 | 0.16 | 0.12 | −0.15 | 0.14 |

X-ray diffraction

| | 29 | 30 | 31 | 32 | 33 | 34 |
|---|---|---|---|---|---|---|
| Main crystal phase | HQMC | HQMC | HQMC | HQMC | HQMC | HQMC |

PROPERTIES OF THE GLASS CERAMICS

| | | Example No. | | | |
|---|---|---|---|---|---|
| | | 35 | 36 | 37 | 38 |
| Glass No. | | 28 | 29 | 29 | 30 |
| Ceramization program | | 1 | 1 | 2 | 1 |

Properties in ceramized form
Transmission, thickness 4 mm

| | | 35 | 36 | 37 | 38 |
|---|---|---|---|---|---|
| 470 nm | % | 1.8 | 5.8 | 5.2 | 0.6 |
| 630 nm | % | 0.6 | 8.3 | 7.0 | 1.0 |
| 950 nm | % | 18.6 | 53.4 | 50.9 | 28.2 |
| 1600 nm | % | 73.2 | 69.1 | 68.1 | 66.1 |
| 3700 nm | % | 49.2 | 46.3 | 46.4 | 47.8 |

Colour coordinates (CIE) in transmission thickness 4 mm, D65

| | | 35 | 36 | 37 | 38 |
|---|---|---|---|---|---|
| x | | | 0.234 | 0.344 | 0.338 | 0.357 |
| y | | | 0.238 | 0.325 | 0.320 | 0.331 |
| Brightness Y | % | 0.9 | 5.9 | 5.0 | 0.6 |
| Colour distance d | | 0.120 | 0.032 | 0.027 | 0.044 |

Colour coordinates (CIELAB) in transmission

| | | 35 | 36 | 37 | 38 |
|---|---|---|---|---|---|
| L* | | 7.9 | 29.1 | 26.8 | 5.6 |
| a* | | 1.2 | 7.1 | 6.5 | 3.2 |
| b* | | −11.0 | 1.7 | 0.4 | 1.3 |
| c* | | 11.1 | 7.3 | 6.5 | 3.5 |
| Flatness of transmission (wavelength at max./min.) | nm | 2.9 470/609 | 1.6 630/527 | 1.6 630/536 | 1.8 630/533 |

Scatter at thickness 4 mm

| | | 35 | 36 | 37 | 38 |
|---|---|---|---|---|---|
| Visual assessment | | 1 | 1 | 1 | 1 |
| Haze | % | 0.2 | 0.6 | 3.4 | 0.3 |

Thermal expansion ($10^{-6}$/K)

| | 35 | 36 | 37 | 38 |
|---|---|---|---|---|
| $\alpha_{20/300}$ | −0.28 | 0.05 | 0.00 | 0.30 |
| $\alpha_{20/700}$ | 0.12 | 0.34 | 0.27 | 0.55 |

X-ray diffraction

| | 35 | 36 | 37 | 38 |
|---|---|---|---|---|
| Main crystal phase | HQMC | HQMC | HQMC | HQMC |

| | | Example No. | | | | |
|---|---|---|---|---|---|---|
| | | 39 | 40 | 41 | 42 | 43 |
| Glass No. | | 31 | 32 | 33 | 34 | 35 |
| Ceramization program | | 2 | 1 | 2 | 2 | 2 |

Properties in ceramized form
Transmission, thickness 4 mm

| | | 39 | 40 | 41 | 42 | 43 |
|---|---|---|---|---|---|---|
| 470 nm | % | 0.7 | 12.1 | 33.2 | 1.9 | 12.5 |
| 630 nm | % | 1.4 | 27.4 | 46.1 | 2.8 | 10.8 |
| 950 nm | % | 34.6 | 54.0 | 71.6 | 33.1 | 51.8 |
| 1600 nm | % | 71.3 | 72.1 | 72.3 | 69.9 | 82.7 |
| 3700 nm | % | 44.3 | 49.9 | 46.1 | 47.7 | 47.0 |

Colour coordinates (CIE) in transmission thickness 4 mm, D65

| | | 39 | 40 | 41 | 42 | 43 |
|---|---|---|---|---|---|---|
| x | | 0.389 | 0.389 | 0.342 | 0.350 | 0.302 |
| y | | 0.366 | 0.385 | 0.348 | 0.347 | 0.313 |
| Brightness Y | % | 0.9 | 19.6 | 38.5 | 2.1 | 10.3 |
| Colour distance d | | 0.085 | 0.095 | 0.035 | 0.041 | 0.019 |

Colour coordinates (CIELAB) in transmission

| | | 39 | 40 | 41 | 42 | 43 |
|---|---|---|---|---|---|---|
| L* | | 8.1 | 51.4 | 68.4 | 16.0 | 38.4 |
| a* | | 4.0 | 5.9 | 4.3 | 2.8 | 1.3 |
| b* | | 5.3 | 21.7 | 9.4 | 3.9 | −3.9 |
| c* | | 6.7 | 22.5 | 10.3 | 4.8 | 4.1 |
| Flatness of transmission (wavelength at max./min.) | nm | 2.1 630/470 | 2.3 630/470 | 1.4 630/470 | 1.5 630/470 | 1.3 470/575 |

Scatter at thickness 4 mm

| | | 39 | 40 | 41 | 42 | 43 |
|---|---|---|---|---|---|---|
| Visual assessment | | 1 | 2 | 1 | 1 | 1 |
| Haze | % | 2.5 | | 1.1 | 2.9 | 1.1 |

Thermal expansion ($10^{-6}$/K)

| | 39 | 40 | 41 | 42 | 43 |
|---|---|---|---|---|---|
| $\alpha_{20/300}$ | 1.23 | −0.37 | 0.32 | 0.23 | −0.14 |
| $\alpha_{20/700}$ | 1.49 | 0.01 | 0.59 | 0.51 | 0.26 |

X-ray diffraction

| | 39 | 40 | 41 | 42 | 43 |
|---|---|---|---|---|---|
| Main crystal phase | HQMC | HQMC | HQMC | HQMC | HQMC |

What is claimed is:

1. A sightglass for a stove, the sightglass comprising:
a substrate made of transparent colored lithium aluminum silicate glass ceramic, wherein, in the wavelength range of 380 nm to 780 nm, the glass ceramic has a light transmittance of 0.1% to 50% when illuminated with a D65 standard illuminant light according to the DIN EN 410 (2011) standard, and has, when illuminated with the D65 standard illuminant light, after passing through the glass ceramic, at a thickness of 4 mm, a color locus in a white region W1 determined by coordinates in a chromaticity diagram CIExyY-2°:

| White region W1 | |
|---|---|
| X | y |
| 0.27 | 0.21 |
| 0.22 | 0.25 |
| 0.32 | 0.37 |
| 0.45 | 0.45 |
| 0.47 | 0.34 |
| 0.36 | 0.29, | wherein the substrate comprises 0.003-0.5% by weight of $MoO_3$ as a coloring component.

2. The sightglass of claim 1, wherein the substrate comprises, as the coloring component, less than 0.2% by weight of $Nd_2O_3$.

3. A sightglass for a stove, the sightglass comprising:
a substrate made of transparent coloring lithium aluminum silicate glass ceramic, wherein, in the wavelength range of 380 nm to 780 nm, the glass ceramic has a light transmittance of 0.1% to 50% when illuminated with a D65 standard illuminant light according to the DIN EN 410 (2011) standard, and, has, when illuminated with the standard illuminant D65 light, after passing through the glass ceramic, at a thickness of 4 mm, a color locus in a white region W1 determined by coordinates in a chromaticity diagram CIExyY-2°:

| White region W1 | |
|---|---|
| X | y |
| 0.27 | 0.21 |
| 0.22 | 0.25 |
| 0.32 | 0.37 |
| 0.45 | 0.45 |
| 0.47 | 0.34 |
| 0.36 | 0.29, | wherein the substrate comprises from 1 ppm to less than 0.015% by weight of $V_2O_5$ as a coloring component.

4. The sightglass of claim 1, wherein the substrate has an $SnO_2$ content of 0.05-0.8% by weight.

5. The sightglass of claim 1, wherein the substrate has an infrared transmission of 45-85% at a wavelength of 1600 nm.

6. The sightglass of claim 1, wherein the sightglass comprises in % by weight based on oxide:
$Li_2O$ 2-5.5;
$Al_2O_3$ 16-26;
$SiO_2$ 58-72; and
$MoO_3$ 0.003-0.5.

7. The sightglass of claim 1, further comprising high quartz mixed crystals as a main crystal phase.

8. The sightglass of claim 1, wherein the substrate is configured as a stove sightglass and has a thickness of 2 to 8 mm.

9. The sightglass of claim 1, wherein the substrate is configured as a baking oven sightglass and has a thickness of 2 to 8 mm.

10. The sightglass of claim 1, wherein the substrate is configured as a barbecue sightglass and has a thickness of 2 to 8 mm.

11. The sightglass of claim 1, wherein the substrate comprises less than 0.01% by weight of $V_2O_5$.

12. The sightglass of claim 1, wherein the light transmittance of the glass ceramic is 0.1% to 10%.

13. The sightglass of claim 1, wherein the light transmittance of the glass ceramic is 2% to 6%.

14. The sightglass of claim 1, wherein the substrate comprises $MoO_3$ and $V_2O_5$ as coloring components in a relationship (in % by weight) of $MoO_3/V_2O_5$ that is greater than 1.

15. The sightglass of claim 14, wherein the relationship of $MoO_3/V_2O_5$ is greater than 3.

16. The sightglass of claim 14, wherein the relationship of $MoO_3/V_2O_5$ is greater than 5.

17. The sightglass of claim 14, wherein the relationship of $MoO_3/V_2O_5$ is greater than 10.

18. A sightglass for a stove, the sightglass comprising:
a substrate made of transparent coloring lithium aluminum silicate glass ceramic,
wherein, in the wavelength range of 380 nm to 780 nm, the glass ceramic has a light transmittance of 0.1% to 50% when illuminated with a D65 standard illuminant light according to the DIN EN 410 (2011) standard, and that prevents viewing into the stove when the stove is not in operation and has, when illuminated with the standard illuminant D65 light, after passing through the glass ceramic, at a thickness of 4 mm, a color locus in a white region W1 determined by coordinates in a chromaticity diagram CIExyY-2°:

| White region W1 | |
|---|---|
| X | Y |
| 0.27 | 0.21 |
| 0.22 | 0.25 |
| 0.32 | 0.37 |
| 0.45 | 0.45 |
| 0.47 | 0.34 |
| 0.36 | 0.29, | and
wherein the glass ceramic comprises in % by weight based on oxide:
$Li_2O$ 2-5.5;
$Al_2O_3$ 16-26;
$SiO_2$ 58-72.

* * * * *